United States Patent
Koseki et al.

(10) Patent No.: US 11,932,921 B2
(45) Date of Patent: Mar. 19, 2024

(54) ALLOY COMPOSITION, METHOD FOR PRODUCING ALLOY COMPOSITION, AND DIE

(71) Applicant: Proterial, Ltd., Tokyo (JP)

(72) Inventors: Shuho Koseki, Tokyo (JP); Kenichi Inoue, Tokyo (JP); Hiroshi Shiratori, Tokyo (JP); Kazuya Shinagawa, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 31 days.

(21) Appl. No.: 17/416,920

(22) PCT Filed: Mar. 27, 2020

(86) PCT No.: PCT/JP2020/014243
§ 371 (c)(1),
(2) Date: Jun. 21, 2021

(87) PCT Pub. No.: WO2020/196879
PCT Pub. Date: Oct. 1, 2020

(65) Prior Publication Data
US 2022/0049329 A1 Feb. 17, 2022

(30) Foreign Application Priority Data
Mar. 27, 2019 (JP) .................... 2019-061018

(51) Int. Cl.
*C22C 1/02* (2006.01)
*B22F 1/00* (2022.01)
(Continued)

(52) U.S. Cl.
CPC .............. *C22C 1/02* (2013.01); *B22F 1/00* (2013.01); *B33Y 70/00* (2014.12); *C22C 27/04* (2013.01); *C22C 30/00* (2013.01); *B33Y 80/00* (2014.12)

(58) Field of Classification Search
None
See application file for complete search history.

(56) References Cited

U.S. PATENT DOCUMENTS

| | | |
|---|---|---|
| 4,846,885 A | 7/1989 | Asphahani et al. |
| 4,950,327 A | 8/1990 | Eck et al. |

(Continued)

FOREIGN PATENT DOCUMENTS

| | | |
|---|---|---|
| CN | 105852035 A | 8/2016 |
| CN | 108546862 A | 9/2018 |

(Continued)

OTHER PUBLICATIONS

"Hardness Conversion Table." Stal & Metaller. https://www.bbshalmstad.se/en/infocenter/hardness-conversion-table/. Accessed Oct. 4, 2023. (Year: 2023).*

(Continued)

*Primary Examiner* — Brian D Walck
(74) *Attorney, Agent, or Firm* — Pearne & Gordon LLP

(57) ABSTRACT

An object is to provide an alloy composition that has a sufficient melting point for casting of an aluminum alloy, also has high hardness, and can suppress an occurrence of galling. The alloy composition of the present invention includes: a Mo—Cr-based dendritic structure 3; and a Ni—Al-based interdendritic structure 5 that fills a periphery of the Mo—Cr-based dendritic structure 3. The alloy composition of the present invention can adopt a chemical composition I in which when Mo+Cr+Ni+Al=100 at. % holds, Ni+Al=15 to 50 at. % and Mo+Cr=50 to 85 at. % hold; or (Continued)

a chemical composition II in which Ni+Al=40 to 70 at. % and Mo+Cr=30 to 60 at. % hold.

9 Claims, 15 Drawing Sheets

(51) Int. Cl.
  *B33Y 70/00* (2020.01)
  *B33Y 80/00* (2015.01)
  *C22C 27/04* (2006.01)
  *C22C 30/00* (2006.01)

(56) References Cited

U.S. PATENT DOCUMENTS

| | | |
|---|---|---|
| 5,314,659 A | 5/1994 | Hidaka et al. |
| 5,425,822 A | 6/1995 | Hidaka et al. |
| 5,858,558 A | 1/1999 | Zhao et al. |
| 2018/0236612 A1 | 8/2018 | Cui et al. |

FOREIGN PATENT DOCUMENTS

| | | |
|---|---|---|
| JP | H01168837 A | 7/1989 |
| JP | H01-502680 A | 9/1989 |
| JP | H05-271841 A | 10/1993 |
| JP | H0649573 A | 2/1994 |
| JP | 2002088431 A | 3/2002 |
| JP | 2017057461 A | 3/2017 |

OTHER PUBLICATIONS

Li et al. "Microstructure and Properties of FeAlCrNiMox High-Entropy Alloys." JMEPEG (2016) 25: 2164-2169. Published online Apr. 19, 2016. (Year: 2016).*
Office Action for Chinese Application No. 202080006064.6 dated Mar. 4, 2022 and translation thereof.
Translation of the Written Opinion of the International Searching Authority for PCT/JP2020/014243 dated Sep. 28, 2021.
International Search Report for PCT/JP2020/014243 dated Jun. 30, 2021.
Written Opinion for PCT/JP2020/014243 dated Jun. 30, 2021.

* cited by examiner

Sample No. 1

Sample No. 3

Sample No. 4

Sample No. 5   Alloy composition: Mo (15 at.%) Cr (35 at.%) Ni (25 at.%) Al (25 at.%)

Sample No. 6  Alloy composition: Mo (10 at.%) Cr (50 at.%) Ni (20 at.%) Al (20 at.%)

Sample No. 8 (Additively manufactured body) laser-beam output: 1.6 kW
Alloy composition: Mo (19 at.%) Cr (19 at.%) Ni (28 at.%) Al (34 at.%)

Sample No. 9 (Additively manufactured body) laser-beam output: 2.0 kW
Alloy composition: Mo (19 at.%) Cr (19 at.%) Ni (28 at.%) Al (34 at.%)

Sample No. 7 (Ingot)
Alloy composition: Mo (19 at.%) Cr (19 at.%) Ni (28 at.%) Al (34 at.%)

Sample No. 8 (Additively manufactured body) laser-beam output: 1.6 kW
Alloy composition: Mo (19 at.%) Cr (19 at.%) Ni (28 at.%) Al (34 at.%)

Sample No. 8 (Additively manufactured body) laser-beam output: 1.6 kW
Alloy composition: Mo (19 at.%) Cr (19 at.%) Ni (28 at.%) Al (34 at.%)

Diffraction pattern of dendritic structure in region A

Z=[012] Incidence

Sample No. 8 (Additively manufactured body) laser-beam output: 1.6 kW
Alloy composition: Mo (19 at.%) Cr (19 at.%) Ni (28 at.%) Al (34 at.%)

ALLOY COMPOSITION, METHOD FOR PRODUCING ALLOY COMPOSITION, AND DIE

CROSS-REFERENCE TO RELATED APPLICATIONS

This is a National Stage application of PCT international application PCT/JP2020/014243, filed on Mar. 27, 2020, which claims the priority of Japanese Patent Application No. 2019-061018, filed Mar. 27, 2019, both of which are incorporated herein by reference in their entirety.

TECHNICAL FIELD

The present invention relates to an alloy composition suitable for a repairing material for a die, which is used when an aluminum alloy is cast, for example.

BACKGROUND ART

JIS SKD61, for example, is used for dies which are used for low pressure casting, gravity casting and die-casting of aluminum alloys. When the casting is repeated in the same die, damage occurs in the die. Erosion and galling are known as causes of the damage.

When the damage occurs, the damaged portion is repaired by building up by welding. As the repairing material, an alloy is preferable which has a high melting point, is excellent in creep resistance characteristics at high temperatures, and is excellent in erosion resistance. One example of this alloy is disclosed in Patent Literature 1.

CITATION LIST

Patent Literature

Patent Literature 1: JP 1989-502680W

SUMMARY OF INVENTION

Technical Problem

The alloy disclosed in Patent Literature 1 has a high melting point and is excellent in high-temperature deformation resistance characteristics, and accordingly, it is assumed that the alloy will have erosion resistance to an aluminum alloy. However, the alloy disclosed in Patent Literature 1 is insufficient for galling which is one of the causes of the damage of the die. Specifically, it is required for the galling that hardness is high, but the alloy disclosed in Patent Literature 1 has a hardness of about 300 to 370 in HV and about 30 to 38 in HRC, and the hardness is low.

As described above, the present invention is directed at providing: an alloy composition which has the erosion resistance to casting, for example, of an aluminum alloy, has high hardness, and can suppress occurrence of the galling; a method for producing the alloy composition: and a die using the alloy composition.

Solution to Problem

The present invention provides an alloy composition that includes: a Mo—Cr-based dendritic structure; and a Ni—Al-based interdendritic structure which fills a periphery of the Mo—Cr-based dendritic structure, and is excellent in erosion resistance and galling resistance.

In the alloy composition of the present invention, the following chemical composition I is adopted when the erosion resistance is regarded as important, and the following chemical composition II is adopted when effects of improvement of the galling resistance, which originates from high hardness, and lowering of a melting point of the alloy composition are regarded as important.

<Chemical Composition I>

When Mo+Cr+Ni+Al=100 at. % holds, Ni+Al=15 to 50 at. %, and Mo+Cr=50 to 85 at. % hold.

<Chemical Composition II>

When Mo+Cr+Ni+Al=100 at. % holds, Ni+Al=40 to 70 at. %, and Mo+Cr=30 to 60 at. % hold.

In the alloy composition of the present invention, when the chemical composition I is adopted, a percentage of an area which the Mo—Cr-based dendritic structure occupies in the whole of the structures is preferably 50 to 85%.

In the alloy composition of the present invention, when the chemical composition II is adopted, a percentage of an area which the Mo—Cr-based dendritic structure occupies in the whole of structures is preferably 50 to 65%.

Chemical compositions I and II have overlapping ranges. It is most preferable to adopt these overlapping ranges which are specifically Ni+Al=40 to 50 at. % and Mo+Cr=50 to 60 at. %, from the viewpoint of improvement of erosion resistance and hardness, and lowering of the melting point of the alloy composition.

In the alloy composition of the present invention, a region where a Cr/Mo ratio is different preferably exists in the Mo—Cr-based dendritic structure. Examples of the regions where the Cr/Mo ratios are each different in the Mo—Cr-based dendritic structure include such a form that the Cr/Mo ratio is high in an edge portion of a dendrite as compared with that in a middle portion of a dendritic structure.

In the alloy composition of the present invention, the maximum arm width of the Mo—Cr-based dendritic structure is preferably 50 μm or smaller, and is more preferably 10 μm or smaller.

In the alloy composition of the present invention, the Rockwell hardness is preferably HRC 45 or higher.

As a method for producing the alloy composition described above, the present invention proposes a production method including melting a raw material powder that contains one or both of an elemental metal powder of Mo, Cr, Ni or Al, and an alloy powder including two or more metals selected from Mo, Cr, Ni and Al, and solidifying the melt.

Further, as a method for producing the alloy composition described above, the present invention proposes a production method in which the alloy composition is additively manufactured while melting a raw material powder that contains one or both of an elemental metal powder of Mo, Cr, Ni or Al, and an alloy powder including two or more metals selected from Mo, Cr, Ni and Al, and solidifying the melt. The additive manufacturing is effective in refining the Mo—Cr-based dendritic structure.

The production method of the present invention can also be applied to a method of repairing a built-up die by melting a raw material powder that contains one or both of an elemental metal powder of Mo, Cr, Ni or Al, and an alloy powder containing two or more metals selected from Mo, Cr, Ni and Al and solidifying the melt.

In addition, the alloy composition of the present invention can be applied to an alloy powder for the additive manufacturing, or to an alloy ingot.

Advantageous Effect of Invention

According to the alloy composition of the present invention, the erosion resistance is mainly improved by the Mo—Cr-based dendritic structure. In addition, due to the Ni—Al-based interdendritic structure, mainly hardness becomes higher. Thereby, the alloy composition can be obtained which has the erosion resistance and the high hardness, and can suppress the occurrence of die galling in casting of an aluminum alloy, for example.

DESCRIPTION OF EMBODIMENTS

An embodiment of the present invention will be described below with reference to the accompanying drawings. Note that a numerical range expressed by use of "to" means to include numerical values described before and after "to", as a lower limit value and an upper limit value, respectively. In addition, the upper limit value and the lower limit value can be arbitrarily combined.

When being used in a die for casting, the alloy composition according to the present embodiment has the erosion resistance and also the hardness which can suppress galling. These characteristics are obtained exclusively due to the structure.

[Structure]

Figure 1:
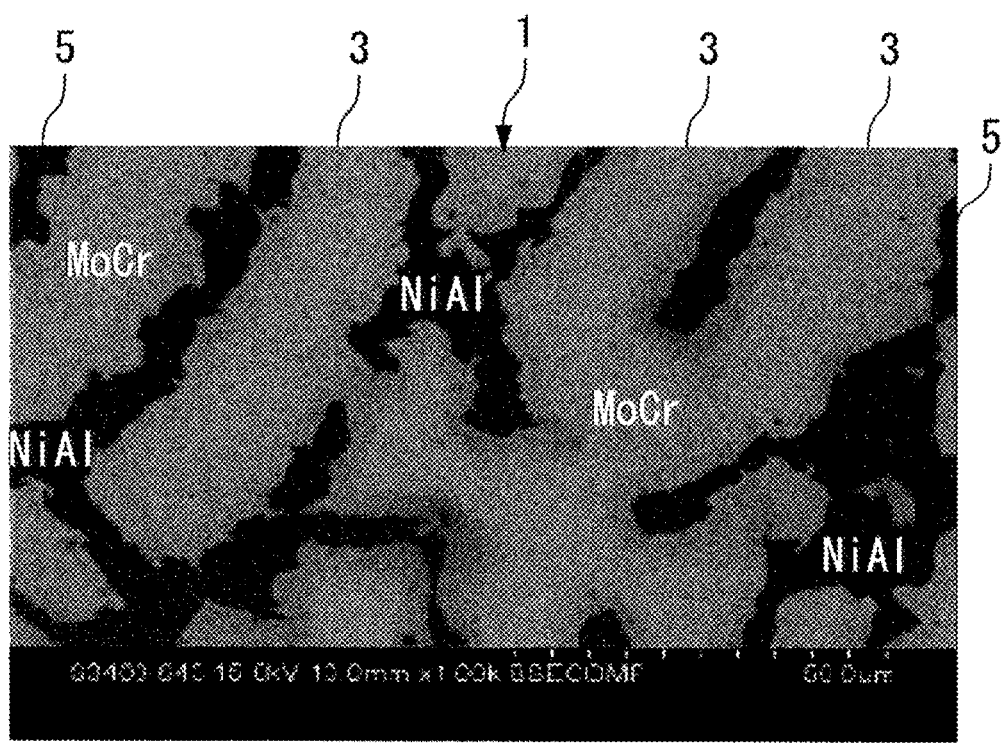
FIG. 1 is a photograph showing a microstructure of an alloy composition according to Example of the present invention by a scanning electron microscope (SEM).

As shown in FIG. 1, the alloy composition 1 according to the present embodiment includes two phases of a dendritic structure 3 and an interdendritic structure 5. The dendritic structure is also referred to as a dendrite structure (dendrite).

In FIG. 1, the dendritic structure 3 has high brightness and is shown by white color, and the interdendritic structure 5 has low brightness and is shown by gray color. The dendritic structure 3 forms a Mo—Cr phase which mainly contains Mo and Cr, and constitutes a main phase of the alloy composition 1. The interdendritic structure 5 forms a Ni—Al phase which contains mainly Ni and Al, and constitutes a sub-phase responsible for hardening of the entire alloy. The interdendritic structure is also referred to as an interdendrite structure, an intercolumnar structure, or the like.

[Dendritic Structure]

The dendritic structure 3 imparts the erosion resistance to the alloy composition 1 according to the present embodiment.

In the dendritic structure 3, Mo has a high melting point of 2623° C., and in consideration of only the erosion resistance, only Mo may result in constituting the main phase. However, when the alloy composition 1 is used as a die for casting, oxidation resistance is also required in addition to the erosion resistance. Then, in order to improve the oxidation resistance, Cr had better be contained in addition to Mo. A melting point of Cr is 1907° C. which is lower than that of Mo, but Cr forms an extremely thin and dense protective oxide ($Cr_2O_3$) on the surface, and contributes to the oxidation resistance.

The dendritic structure 3 mainly has a body-centered cubic lattice structure (body-centered cubic: bcc), but partially has a B2 ordered phase. The B2 ordered phase is an ordered phase which mainly contains Ni and Al.

In the dendritic structure 3, when the amount of Mo increases, the erosion resistance becomes high, and when the amount of Cr increases, the oxidation resistance becomes high. A ratio of Mo and Cr may be determined according to required characteristics. Specifically, a ratio of Mo may be set high when the erosion resistance is particularly required, and a ratio of Cr may be set high when the oxidation resistance is particularly required. However, in the dendritic structure 3, the oxidation resistance can be obtained even though the amount of Cr to be added is small. Note that the dendritic structure 3 mainly contains a Mo—Cr-based solid solution in which contents of upper two elements of Mo and Cr are large, and does not prevent containing Ni, Al, unavoidable impurities and the like which are contained in the interdendritic structure 5. Hereinafter, in this specification, the dendritic structure may be referred to as a Mo—Cr-based dendritic structure. Note that as shown in Examples which will be described later, the Mo—Cr-based dendritic structure should not be interpreted as a structure containing only Mo and Cr, but elements such as Al and Ni are allowed to be contained therein.

In the Mo—Cr-based dendritic structure 3, Cr is concentrated in an edge portion of the dendritic structure, and the Cr concentration is high in the edge. This is seen from FIG. 1, in which the colors of the edge portions in the primary dendritic arm and the secondary dendritic arm become deeper. The edge portion of the dendrite is a connecting region between the interdendritic structure and the dendritic structure, and it is desirable that the composition is inclined in order to give continuity to the structures. A state in which the composition is inclined and there is continuity between the interdendritic structure and the dendritic structure means a state in which characteristics such as the erosion resistance, the oxidation resistance and the high hardness of each of Mo, Cr, Ni and Al are continuously inclined, in other words, it is hard to occur characteristic differences depending on the places. The concentration distribution of each element in the dendritic structure can be evaluated by EPMA (Electron Probe Micro Analyzer). Firstly, a mirror-polished sample is prepared, and a region (for example, 50 μm×50 μm) in which a dendritic structure sufficiently fits is subjected to area analysis. The obtained analysis result is converted into a display by concentration. Such arbitrary positions as to cross the dendritic structure are subjected to evaluation by line analysis, and element distribution is evaluated. Cr/Mo ratios are calculated at the edge portion of the dendrite and in a middle portion of the dendrite, respectively. In the alloy composition of the present invention, it has been confirmed that when the Cr/Mo ratios are compared between the edge portion of the dendrite and the middle portion of the dendrite, the Cr/Mo mass ratio (weight ratio) is higher in the edge portion of the dendrite than in the middle portion of the dendrite. In this way, the element distribution in the inner part of the dendritic structure can be evaluated. It should be noted that in the edge portion, a ratio of Cr content increased and the contents of Ni and Al also increased. It is valid that the solid solution of NiAl is enhanced or the precipitation is enhanced in the edge portions of the dendrite, as an erosion resistant alloy to Al.

The B2 ordered phase existing in the dendritic structure that mainly includes bcc can be checked by high magnification observation by TEM (Transmission Electron Microscope). As a sample for observation, a test piece having a thickness of about 100 nm can be cut out by a microsampling method, for example, using a Focused Ion Beam (FIB), and be subjected to the TEM observation. In the TEM observation, a selected area diffraction of ϕ200 nm is performed which aims at a dendritic structure, and a diffraction pattern showing a bcc structure and a spot of a B2 ordered phase slightly existing can be identified from the analysis result of the obtained electron beam diffraction image. In addition, when a dark field image is captured in conformity to the spot of the B2 ordered phase, a distribution state of the B2 ordered phase can be checked. In the alloy composition of the present invention, it has been confirmed that granular B2 ordered phases exist which have a size of about 100 nm (see FIG. 15). The existence of these granular B2 ordered phases is considered to have contributed to the increase of the hardness and the height of softening resistance in the alloy composition of the present invention.

[Interdendritic Structure]

Next, the interdendritic structure according to the present embodiment imparts mechanical strength, particularly hardness, to the alloy composition according to the present embodiment. The hardness is required in order to cope with the galling which occurs in casting.

The interdendritic structure 5 includes a solid solution or an intermetallic compound which mainly contains Ni and Al. The interdendritic structure 5 preferably includes a NiAl intermetallic compound which contains Ni and Al in a ratio of approximately 1:1. This intermetallic compound has a body-centered cubic lattice structure (body-centered cubic: bcc), and a B2-type of crystal structure which is similar to the body-centered cubic lattice structure. These intermetallic compounds are excellent in a high temperature strength and the oxidation resistance, and are suitable for the die for casting of the aluminum alloy. The melting point of the NiAl intermetallic compound is 1638° C., and the hardness is about HRC 41. In addition to NiAl, $Ni_3Al$ can also constitute the interdendritic structure 5 that contains Ni and Al, by an intermetallic compound of an L12 type ordered structure having an adequate symmetry, which has a face-centered cubic crystal as a primitive lattice. The hardness of $Ni_3Al$ is about HRC 44. For information, several Ni—Al-based intermetallic compounds exist, and the hardness of $Ni_2Al_3$, for example, is about HRC 62. These intermetallic compounds are formed in the additive manufacturing process, and do not greatly change even when exposed to a temperature range of about 500° C. to 700° C. Because of this, when the alloy composition of the present application is applied to a die to which molten Al at about 700° C. repeatedly adheres, the hardness of the alloy composition does not change, in other words, the softening resistance is high, and the hardness is maintained. In short, the alloy composition of the present invention has a stable structure even at 700° C., and accordingly resists causing a change against loads which are repeatedly applied at this temperature; and it is also a feature advantageous over conventional materials that the hardness hardly decreases even when the alloy composition has been supplied to a long period of use.

Examples of a typical conventional material applied to a die for Al die-casting include SKD61. In practice, SKD61 is often used with a hardness exceeding 40 HRC, but in most cases, is tempered to 45 HRC by heat treatment. The tempering temperature at this time is about 600° C. to 650° C., and accordingly, the SKD61 is softened when molten Al having a temperature of 700° C. which exceeds the tempering temperature repeatedly adheres to the substrate as it is. Because of this, there is a case where the surface of the substrate made of SKD61 is subjected to nitridation treatment (for example, nitridation treatment for improving surface layer of 50 to 200 μm to about 800 to 1000 Hv), but when the nitridation treatment is applied to the die for the Al die-casting, there is a problem that a nitrided layer gradually disappears due to the repeated thermal effect, and finally the substrate made of the SKD61 is softened.

Note that the interdendritic structure 5 mainly contains a Ni—Al-based intermetallic compound having a large content of upper two elements of Ni and Al, and does not prevent containing Mo, Cr, unavoidable impurities and the like which are contained in the dendritic structure 3. Hereinafter, in this specification, the interdendritic structure is referred to as a Ni—Al-based interdendritic structure, in some cases. Note that as shown in Examples which will be described later, the Ni—Al-based interdendritic structure should not be interpreted as a structure containing only Ni and Al, but a trace amount of elements such as Mo and Cr is allowed to be contained.

As is shown in FIG. 1, the interdendritic structure 5 exists so as to fill spaces among the Mo—Cr-based dendritic structures 3. The interdendritic structure 5 contains Al, and accordingly it is preferable that the amount of the interdendritic structure 5 occupying the alloy composition is small, from the viewpoint of the erosion resistance. However, in order to cope with the galling, it is preferable that the hardness of the material constituting the die is high. Then, in the present embodiment, hardening by forming the Ni—Al-based interdendritic structure 5 is used. It is desirable that the hardness of the alloy in the present embodiment is higher than the hardness of the SKD61 before heat treatment, which is used as the base material of the die, for the purpose of improvement of the galling resistance. Specifically, the alloy in the present embodiment has HRC 45 or higher, further HRC 50 or higher, and preferably HRC 55 or higher. If the hardness is too high, the toughness results in decreasing, and accordingly the upper limit is HRC 70, preferably HRC 65 or lower.

[Ratio Between Main Phase and Subphase]

In the alloy composition according to the present embodiment, when the erosion resistance is regarded as important, it is preferable that a ratio of an area which the dendritic structure 3 occupies in the entire alloy is 50 to 85%.

When the area ratio of the dendritic structure 3 is smaller than 50%, there is a possibility that sufficient erosion resistance is not obtained. Note that the erosion resistance is greatly affected by the ratio of the area which the dendritic structures 3 occupies, but is also affected by a degree of fineness of the dendritic structure 3. Specifically, as the dendritic structure 3 is finer, the erosion resistance is improved. On the other hand, when the area ratio of the dendritic structure 3 exceeds 85%, the amount of the interdendritic structure 5 serving as a hardening phase decreases, and there is a possibility that sufficient hardness cannot be obtained. Note that the hardness is also greatly affected by the ratio of the area which the interdendritic structure 5 occupies, but is also affected by a degree of the fineness of the dendritic structure 3. Specifically, even though the compositions are the same, as the dendritic structure 3 is finer, the hardness is improved.

As described above, it is preferable to adjust the ratio of the area which each of the dendritic structure 3 and the interdendritic structure 5 occupies, by changing the composition ratio of the raw material, changing a cooling rate at the time of the additive manufacturing, or the like, in consideration of the erosion resistance and the hardness.

For information, the ratio of the area which the dendritic structure 3 occupies in the entire alloy is obtained by an operation of polishing a cross section of the alloy into a mirror surface, performing SEM observation, converting the SEM image into a two-gradation image, and then deriving the ratio.

In the alloy composition according to the present embodiment, when the hardness or the lowering of the melting point is regarded as more important than the erosion resistance, it is preferable that the ratio of the area which the dendritic structure 3 occupies in the entire alloy is 50 to 65%. In other words, when the ratio of the area which the dendritic structure 3 occupies in the entire alloy is 50 to 65%, the ratio of the area which the interdendritic structures 5 serving as the hardening phase occupies in the entire alloy becomes 35 to 50%, and accordingly sufficient hardness tends to be easily obtained. In addition, Mo which is a main component of the dendritic structure 3 has a high melting point, and accordingly the melting point of the alloy composition can be lowered by setting the ratio of the area which the dendritic structure 3 occupies in the entire alloy to 50 to 65%.

[Arm Width of Dendritic Structure]

As described above, as the dendritic structure is finer, the erosion resistance is improved. In addition, as the dendritic structure is finer, the hardness becomes high. In the present embodiment, the degree of fineness in the dendritic structure shall be specified by an arm width of the dendritic structure.

Figure 2A:
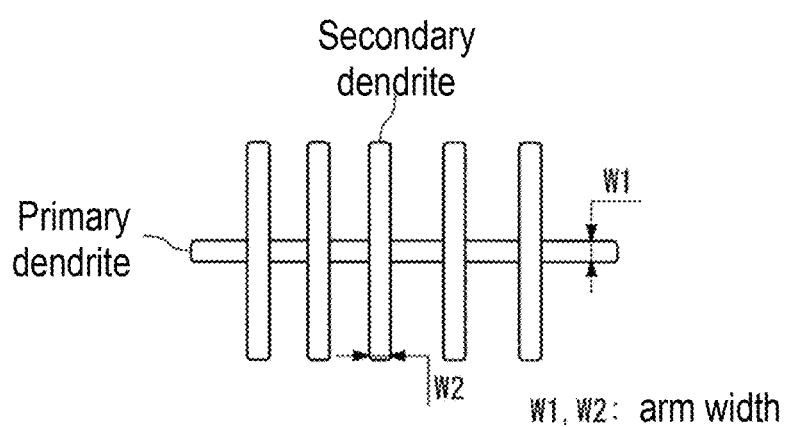
FIG. 2A, FIG. 2B and FIG. 2C each describe an arm width W1 of a primary dendrite and an arm width W2 of a secondary dendrite of a dendritic structure according to the present invention, FIG. 2A being a view specifying the arm width W1 of the primary dendrite and the arm width W2 of the secondary dendrite on the basis of a model of a dendrite crystal, and FIG. 2B and FIG. 2C being microstructure photographs which specify the arm width W1 of the primary dendrite and the arm width W2 of the secondary dendrite, on the basis of the alloy composition according to Example of the present invention.

FIG. 2A shows a modeled dendrite crystal. In the dendrite crystal, a primary dendrite which can be referred to as a trunk is firstly formed, and subsequently a secondary dendrite which can be referred to as a branch is formed so as to be orthogonal to the axis of the primary dendrite. In the present embodiment, it is preferable that the maximum arm widths W1 and W2 of the dendritic structure are both 50 μm or smaller, which includes the primary dendrite and the secondary dendrite. The maximum arm widths W1 and W2 are more preferably 30 μm or smaller, the maximum arm widths W1 and W2 are further preferably 20 μm or smaller, and the maximum arm widths W1 and W2 are still more preferably 10 μm or smaller. The maximum arm width W1 can be obtained by determining the maximum value of the width in a direction orthogonal to the extending direction of the primary dendritic arm as the maximum arm width W1, in a field of view of a SEM image which has been captured at a magnification of 300 times. Similarly, the maximum arm width W2 can be obtained by determining the maximum value of the width in a direction orthogonal to the extending direction of the secondary dendritic arm as the maximum arm width W2, in a field of view of a SEM image which has been captured at a magnification of 300 times.

Figure 2B:
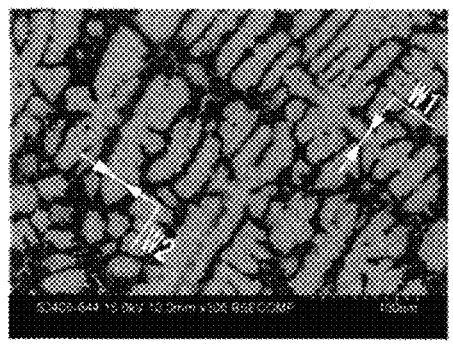

In FIG. 2B, arm widths W1 and W2 in Sample No. 1 of Example are shown which will be described later. The maximum arm width W1 of Sample No. 1 is about 20 μm, and the maximum arm width W2 is about 45 μm. Hereinafter, the maximum arm widths W1 and W2 are simply referred to as arm widths W1 and W2, in some cases.

Figure 2C:
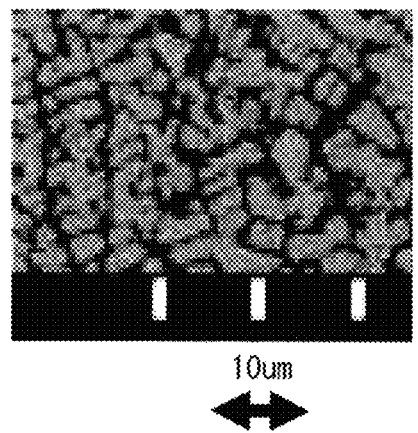

In FIG. 2C, a photograph of a microstructure of Sample No. 4 of Example is shown which will be described later, and it is understood that both of the arm width W1 and the arm width W2 are 10 μm or smaller. Thus, the structure of Sample No. 4 is finer than that of Sample No. 1. From the two photographs of FIGS. 2B and 2C, it is understood that when the arm widths W1 and W2 of the dendritic structure are small, in other words, when the dendritic structure is fine, the interdendritic structure which fills the spaces among the dendrite crystals also becomes fine. This means that even if the ratios which the dendritic structure and the interdendritic structure occupy in the entire alloy are the same, as the arm widths W1 and W2 become smaller, each single of the dendritic structures and the interdendritic structures becomes smaller.

As described above, when MoCr is compared with NiAl, the erosion resistance of NiAl is inferior. Here, when the Ni—Al-based interdendritic structure is made fine, an area contributing to the erosion becomes small, and only a part of the surface layer is eroded, accordingly, the elution amount is consequently reduced, and the erosion resistance of the entire alloy composition is improved. Such refinement of the structure leads to an improvement in the hardness as described above, and accordingly contributes to an improvement in the erosion resistance and the hardness which are necessary for suppressing the damage of the die.

Here, it is known that the erosion is caused by the following two mechanisms.

Physical Erosion (Cavitation Erosion)

When molten metal is suddenly accelerated at a portion in which the shape is suddenly changed in the inner part of the die, and cavitation occurs, erosion occurs. The cavitation means a physical phenomenon in which a bubble occurs and disappears in a short period of time in a liquid flow due to a pressure difference. Because a stress due to impact of pressure, which occurs when the bubble disappears, acts of mechanically damages the surface, as a counter measure against the damage, it is effective to improve the strength of the surface. Specifically, it can be said that the improvement in the hardness is effective for the erosion resistance.

Chemical Erosion (Erosion Due to Formation of Chemical Compound)

When the molten aluminum alloy comes into contact with the surface of the die, diffusion of aluminum occurs, and the aluminum alloy is deposited on the surface of the die. The surface portion of the die, on which the aluminum alloy has been deposited, falls off together with the deposited aluminum alloy. For such chemical erosion, application of a material having low reactivity with aluminum is effective. Specifically, it is effective to use a material having no eutectic point with aluminum and having a high melting point.

Next, a chemical composition I and a chemical composition II of the alloy composition will be described which has the structures described above.

The chemical composition I is a composition of which the total amount of Mo and Cr is larger than that of the chemical composition II (the upper limit value of Mo+Cr is 85 at. %), and in which the erosion resistance is regarded as important.

In the chemical composition II, the total amount of Ni and Al is larger (the upper limit value of Ni+Al is 70 at. %) than that in the chemical composition I. The chemical composition II is a composition in which effects of improvement of the galling resistance due to high hardness and lowering of a melting point of the alloy composition are regarded as important.

When the amount of Ni+Al increases, the hardness of the alloy composition according to the present embodiment becomes high, but the erosion resistance becomes low in some cases. When the amount of Mo+Cr increases, the erosion resistance of the alloy composition according to the present embodiment becomes high, but the hardness becomes low and the melting point becomes high. Based on these tendencies, the chemical compositions I and II can be appropriately adopted according to a production method and an application of the alloy composition.

[Chemical Composition I of Alloy Composition]

When Ni+Al=15 to 50 at. %, Mo+Cr=50 to 85 at. %, and Mo+Cr+Ni+Al=100 at. % hold, Ni: 7.5 to 25 at. %, Al: 7.5 to 25 at. %, Cr: 10 to 25 at. %, and the balance: Mo and unavoidable impurities hold.

The amount of Ni+Al affects the amount of the interdendritic structure. Specifically, when the amount of Ni+Al becomes 15 at. % or more, the hardness for suppressing the mechanical damage is imparted. When the amount of Ni+Al exceeds 50 at. %, the amount of the dendritic structure decreases that contains Mo and Cr, which is mainly responsible for the erosion resistance. Then, it is preferable to control Ni+Al to 15 to 50 at. %. The content of Ni+Al is more preferably 20 to 45 at. %, and is further preferably 30 to 45 at. %.

Each of Ni and Al can be contained in a range of 7.5 to 25 at. %. When each content is less than 7.5 at. %, the amount of the interdendritic structure is small and the hardness becomes insufficient in some cases. In addition, when the content exceeds 25 at. %, the amount of the dendritic structure including Mo and Cr decreases, and erosion resistance becomes insufficient in some cases.

The amount of each of Ni and Al is more preferably 10 to 25 at. %, is further preferably 15 to 25 at. %, and is still more preferably 20 to 25 at. %.

Next, the amount of Mo+Cr affects the erosion resistance. Specifically, if the amount of Mo+Cr is less than 50 at. %, the amount of the dendritic structure decreases which is mainly responsible for the erosion resistance. If the amount of Mo+Cr exceeds 85 at. %, the melting point of the raw material becomes high, and it is concerned that the following problems occur. In addition, the amount of the interdendritic structure 5 decreases which is responsible for precipitation hardening. Then, it is preferable to control Mo+Cr to 50 to 85 at. %. The content of Mo+Cr is more preferably 50 to 80 at. %, and is further preferably 50 to 70 at. %.

<Problems when Amount of Mo+Cr Exceeds 85 at. % and Melting Point of Raw Material Becomes High>

As will be described later, the alloy powder according to the present embodiment can be produced by, for example, an atomization method. In the case of the atomization which is a powder production process, the raw material having the high melting point does not melt successfully in a crucible, and an unmelted material is produced; and then, it is difficult to control the composition of a molten metal.

Even if the alloy powder can be produced by the atomization method, when it is attempted to irradiate the obtained alloy powder with laser beam to additively manufacture the alloy powder, melting, bubble-removing and deposition tend to insufficiently proceed, and there is a high possibility that the additively manufactured body containing defects is formed. In other words, even if the raw material having the high melting point, in which the amount of Mo+Cr exceeds 85 at. %, can be atomized, the resulted powder has poor additive manufacturability.

Even if the raw material having the high melting point is melted in a high-frequency melting furnace of which the output has been increased, the crucible (generally, alumina, zirconia or the like) cannot withstand the temperature and incurs a damage or the like; and the molten metal cannot be tapped, and an alloy cannot be obtained. In addition, even if the damage of the crucible can be avoided, the power consumption is large because a temperature in a path from the crucible to the tapping nozzle needs to be kept at high temperature. In the case where a temperature at the tapping nozzle portion is low, there arises a problem that the tapping nozzle portion is clogged at the time of the tapping.

Cr is contained in a range of 10 to 25 at. %, and Mo is defined as the balance obtained by subtracting Ni, Al and Cr from the entire alloy. When the content of Cr is less than 10 at. %, the oxidation resistance becomes insufficient in some cases, and when the content of Cr exceeds 25 at. %, the amount of Mo decreases which is responsible for the erosion resistance. In other words, it is acceptable to increase the content of Mo when the erosion resistance is regarded as important, and to increase the content of Cr when the oxidation resistance is regarded as important. As the content of Cr is increased, the melting point gradually decreases.

The amount of Cr is more preferably 12 to 20 at. %, and is further preferably 12 to 18 at. %.

C, B and Si form hard particles such as carbides, borides and borosilicides, with Mo, Cr, Ni and Al, while lowering the melting point of the alloy, and thereby contribute to improvement in wear resistance. In addition, Si is also a chemical component to be added as a deoxidizing agent, and also has an effect of enhancing the cleanliness of the molten metal. When the content of C, B and Si is 0.01 at. % or more, the effect is exhibited, but when the content of 8.0 at. % or more is added, the amount of hard particles increases, and cracks tend to easily occur during the additive manufacturing. Because of this, when C, B and Si are positively added in the chemical composition I, the content is set at 0.01 to 8.0 at. %.

[Chemical Composition II of Alloy Composition]

The chemical composition of the alloy composition preferably has the following composition, when the improvement in the galling resistance and the lowering of the melting point of the raw material are regarded as important.

When Ni+Al=40 to 70 at. %, Mo+Cr=30 to 60 at. %, and Mo+Cr+Ni+Al=100 at. % hold, Ni: 20 to 35 at. %, Al: 20 to 35 at. %, Cr: 10 to 50 at. %, and balance: Mo and unavoidable impurities hold.

When the hardness is regarded as important, the amount of Ni+Al is set at 40 at. % or more, which affects the amount of the interdendritic structure. However, when the amount of Ni+Al exceeds 70 at. %, the amount of the Mo—Cr-based dendritic structure decreases which is mainly responsible for the erosion resistance. Then, in order to achieve both of desired hardness and erosion resistance, it is preferable to control Ni+Al to 40 to 70 at. %.

In the chemical composition II, the content of Ni+Al is more preferably 40 to 65 at. %, and is further preferably 40 to 55 at. %.

Each of Ni and Al can be contained in a range of 20 to 35 at. %. By containing Ni and Al in this range, the alloy composition can control the hardness to HRC 50 or higher.

In the chemical composition II, the amount of each of Ni and Al is more preferably 20 to 30 at. %, and is further preferably 20 to 25 at. %.

The amount of Mo+Cr which affects the erosion resistance is set at 30 to 60 at. %, in the chemical composition II. If the amount of Mo+Cr is less than 30 at. %, the amount of the dendritic structure decreases which is mainly responsible for the erosion resistance, and it becomes difficult to obtain the desired erosion resistance. On the other hand, when the amount of Mo+Cr exceeds 60 at. %, the amount of the interdendritic structures 5 decreases, and accordingly, when the hardness is regarded as important, the upper limit of the amount of Mo+Cr is preferably set at 60 at. %.

In the chemical composition II, the content of Mo+Cr is more preferably 35 to 60 at. %, and is further preferably 40 to 60 at. %.

Cr is contained in a range of 10 to 50 at. %, and Mo is defined as the balance obtained by subtracting Ni, Al and Cr from the entire alloy. When the content of Cr is less than 10 at. %, the oxidation resistance becomes insufficient in some cases, and when the content of Cr exceeds 50 at. %, the amount of Mo decreases which is responsible for the erosion resistance. In other words, it is acceptable to increase the content of Mo when the erosion resistance is regarded as important, and to increase the content of Cr when the oxidation resistance is regarded as important.

As described above, as the content of Cr increases, the melting point gradually decreases, but when the content of Cr reaches about 50 at. %, the melting point starts to increase again. Therefore, when the lowering of the melting point of the alloy composition is regarded as important, the more preferable amount of Cr is 15 to 45 at. %, and the further preferable amount of Cr is 20 to 40 at. %. Advantages of lowering of the melting point of the alloy composition include the followings.

<Advantage Due to Lowering of Melting Point of Alloy Composition>

The alloy powder according to the present embodiment can be produced by, for example, an atomization method. When the melting point of the raw material is low, the raw material is successfully melted in the crucible in a short period of time, at the time of atomization, accordingly, a molten metal having a uniform composition tends to be easily obtained, and the molten metal can be tapped without clogging the tapping nozzle.

If the raw material can be melted at a low temperature, the life of the crucible is prolonged, and accordingly, the production cost is reduced.

In the case where the atomized powder is used in the additive manufacturing, the raw material is melted by the output of a general laser beam without leaving an unmelted material, and defoaming and deposition proceed; and accordingly, the additively manufactured body free from defects tends to be easily formed. In other words, a powder produced from an atomized raw material having a low melting point has adequate additive manufacturability.

C, B and Si form hard particles such as carbides, borides and borosilicides, with Mo, Cr, Ni and Al, while lowering the melting point of the alloy, and thereby contribute to improvement in wear resistance. In addition, Si is also a chemical component to be added as a deoxidizing agent, and also has an effect of enhancing the cleanliness of the molten metal. When the content of C, B and Si is 0.01 at. % or more, the effect is exhibited, but when the content of 8.0 at. % or more is added, the amount of hard particles increases, and cracks tend to easily occur during the additive manufacturing. Because of this, also in the chemical composition II, when C, B and Si are positively added, the content is set at 0.01 to 8.0 at. %.

As described above, the chemical composition I and II can be appropriately adopted according to the production method and application of the alloy composition.

Chemical compositions I and II have overlapping ranges. It is most preferable to employ these ranges which are specifically Ni+Al=40 to 50 at. % and Mo+Cr=50 to 60 at. %, from the viewpoint of improvement of erosion resistance and hardness, and lowering of the melting point of the alloy composition.

[Form and Production Method of Alloy Composition]

The alloy composition according to the present embodiment is used as, for example, an alloy ingot and an additively manufactured body which will be described below, or an alloy powder for obtaining the same. For example, the alloy powder is also used as a raw material for a powder building-up method which is a type of additive manufacturing method.

As a method for producing the alloy composition of the present embodiment, the production method can be used that includes melting a raw material powder which contains one or both of an elemental metal powder including at least one of Mo, Cr, Ni and Al, and an alloy powder including at least two metals selected from Mo, Cr, Ni and Al, and solidifying the melt. In addition, the elemental metal powder may be one, two or more, and the alloy powder also may be one or two. As a specific example, a mixture of an Mo powder and a Cr powder which are elemental metal powders and of a NiAl powder which is an alloy powder can be used as a raw material alloy. Alternatively, a mixture of $Ni_3Al$ and MoCr alloys that are the alloy powders can be used as the raw material alloy. Mo and Cr form a continuous solid solution (all proportional solid solution), and accordingly, the composition of the MoCr alloy can be freely adjusted. A CrMo alloy containing a large amount of Cr has a low melting point, and accordingly tends to easily form a trigger for formation of a molten pool.

When a ratio of Cr in the MoCr alloy becomes 80 to 90 at. % (in other words, when ratio of Mo is 10 to 20 at. %), the melting point of the MoCr alloy becomes lowest and becomes about 1700° C. The description that the MoCr alloy containing a large amount of Cr tends to easily form the trigger for the formation of the molten pool means the following. When the MoCr alloy having a lowered melting point is irradiated with laser beam, melting starts from this composition powder. A liquefied MoCr alloy has an active metallic surface and has enhanced fluidity, and accordingly increases contact areas while being wet with the NiAl powder existing around the MoCr alloy to transfer heat; and also is alloyed also at the contact portion, thereby causes the lowering of the melting point, and tends to easily promote melting. In this way, it improves the ease of forming the molten pool and the stability to intermix the composition powders having lowered melting points. Accordingly, due to the mixture of the CrMo alloy containing a large amount of Cr and the NiAl powder, the molten pool can be stably formed, and the additive manufacturability can be improved.

In addition, in the production method of the present embodiment, it is important to have a melting and solidifying step in the process, and one example thereof will be described below.

[Method for Producing Alloy Powder]

Figure 3:
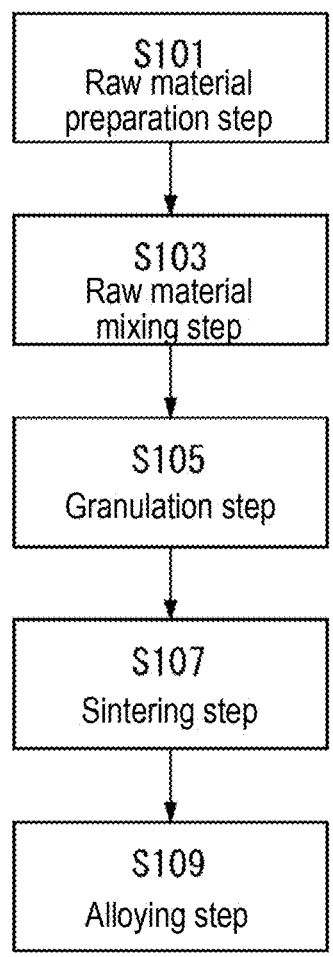
FIG. 3 is a diagram showing a production procedure of the alloy composition according to the present embodiment.

One example of a method for producing the alloy powder will be described with reference to FIG. 3.

The gist of the production method is to granulate a raw material powder with the use of a spray dryer, then sinter the grains and thereby obtain an alloy powder.

This production method includes a raw material preparation step S101, a raw material mixing step S103, a granulation step S105, a sintering step S107, and an alloying step S109.

In the raw material preparation step S101, for example, an Mo powder, a Cr powder, a Ni powder and an Al powder are prepared as raw materials, according to the composition of the alloy composition which is desired to be obtained. The raw material is not limited to a metal powder of a simple substance, and may be, for example, an MoCr alloy powder and a NiAl alloy powder, or an Mo powder, a Cr powder and the NiAl alloy powder. The particle sizes of these raw material powders may be appropriately selected according to the particle size of the alloy powder, which is desired to be obtained.

Next, in the raw material mixing step S103, the raw material powder which has been prepared in the raw material preparation step S101 is mixed with wax such as paraffin, by a wet method. For the mixing, a known device, for example, an attritor can be used; and for example, ethanol serving as a dispersion medium in addition to the raw material powder and the wax is charged into the attritor and are mixed by the wet method; and a slurry of the mixed powder can be obtained.

Next, in the granulation step S105, the slurry obtained in the raw material mixing step is sprayed and dried by a spray dryer to granulate the powder of the mixture.

Next, in the sintering step S107, the powder of the mixture granulated in the granulation step S105 is charged into a drying oven, degreased at a degreasing temperature of 400° C. or higher and 600° C. or lower, and then is sintered at a sintering temperature of 600° C. or higher. The degreasing temperature is a temperature at which the wax to be used can be removed, and the sintering temperature is a temperature required for solidification of the powder particles of the mixture. In the granulated powder having passed through the sintering, the raw material powders adhere to each other, but are not alloyed.

Next, in the alloying step S109, the granulated powder having passed through the sintering step S107 is exposed to a temperature higher than the sintering temperature in the sintering step S107 to be alloyed. For this alloying, for example, thermal plasma-droplet-refining (PDR) can be used which passes the powder through a high temperature region such as plasma. By the alloying treatment using the PDR, the granulated powder is instantaneously melted and solidified. Alternatively, for the purpose of the alloying, the temperature is further raised after the sintering step S107, and the contact portions among each of the powders can be alloyed. This powder has a strength required for use in the additive manufacturing.

Here, the thermal plasma is an ionized gas obtained by applying energy to gas to dissociate molecules in the gas into atomic states, and further ionizing the atoms into ions and electrons; and can heat the powder to a very high temperature as compared with a conventional production method in which a metal piece is heated by an electric furnace, specifically, to a temperature of 5000° C. or higher in a high temperature portion. In the thermal plasma which forms such an extremely high temperature atmosphere, it is possible to instantaneously melt even a powder having a high melting point such as Mo.

In addition, by the thermal plasma, an extremely high temperature atmosphere can be locally generated, and a sharp temperature gradient can be formed between the region of the thermal plasma and the surrounding atmosphere. Due to this sharp temperature gradient, the metal piece is instantaneously melted in the high temperature portion of the thermal plasma, and becomes spherical due to its own surface tension. The spheroidized metal piece is rapidly cooled to a temperature below the melting point by the surrounding atmosphere to be solidified, and can form metal spheres.

Through the above steps, the alloy powder according to the present embodiment is produced. Thus, the granulated powder which has been solidified after the wax has been removed through the sintering step S107 is instantaneously heated in the alloying step S109 to be melted, and is solidified. An alloy powder which has been thereby obtained has a fine dendritic structure. In addition, in the obtained alloy composition, each particle has a shape close to a true sphere due to the surface tension, and the particle surface becomes smooth.

[Other Methods for Producing Powder]

The alloy powder according to the present embodiment can be produced by an atomization method. The atomization method scatters a molten metal as droplets by kinetic energy of a medium which has been sprayed by high pressure, and solidifies the droplets to produce a powder. The atomization method is classified into a water atomization method, a gas atomization method, a jet atomization method and the like, according to a spray medium to be applied. Any atomization method can be adopted for producing the alloy powder according to the present embodiment. The alloy powder which is obtained by the atomization method is also melted and solidified, and the solidification rate is also high; and accordingly the dendritic structure can be refined.

The water atomization method allows a molten metal to flow down from the bottom of a tundish, sprays high-pressure water as a spray medium onto the molten metal flow, and sprays the molten metal by the kinetic energy of this water. The water atomization method has a high cooling rate in the solidification as compared with other atomization methods. However, the obtained powder has an irregular shape.

In the gas atomization method, a high-pressure gas is used as a spray medium, which is, for example, an inert gas such as nitrogen or argon, or air. A powder produced by the gas atomization tends to easily become spherical. This is understood to be mainly because the cooling rate of gas is small as compared with that of water, and the molten particles formed into droplets are spheroidized by the surface tension before being solidified.

In the jet atomization method, a combustion flame of kerosene or the like is used as the spray medium, and a high-speed and high-temperature flame jet which exceeds the speed of sound is injected into the molten metal, and the molten metal is accelerated over a relatively long period of time, and is pulverized. This powder tends to easily become spherical, and a particle size distribution which is further refined can be obtained.

An EiGA method (electrode induction melting gas atomization method) is a method of preparing an ingot in advance, using this ingot as an electrode material, melting the ingot by an induction coil, and directly atomizing the melt. Because MoCr and NiAl have different melting points, and are separated from each other in an atomizing furnace depending on the composition, in some cases, but in this case, by an operation of producing an ingot in a furnace having a large stirring force, and applying the EIGA method thereto, a powder having a homogeneous composition can be obtained.

The method for producing the alloy powder described above is one example in the present invention, and the present invention can produce the alloy powder by another production method.

[Method for Producing Alloy Ingot]

An alloy ingot can be obtained most typically by a melting and casting method including obtaining a molten metal in a melting furnace, then pouring the molten metal into a predetermined die, and solidifying the molten metal. Examples of the melting furnace include: a furnace for melting by converting electrical energy into thermal energy; an electric resistance furnace using Joule heat; a low frequency induction furnace using an electromagnetic induction current; a high frequency induction furnace using an eddy current; and an arc melting furnace.

The alloy ingot obtained by the melting and casting method has a shape which corresponds to a shape of the die, and can take various shapes such as a flat plate shape and a rectangular parallelepiped shape.

The alloy ingot according to the present embodiment includes a member which has been additively manufactured by an additive manufacturing method. The additive manufacturing method described here means a method of repeating an operation of melting a raw material powder and solidifying the melt to form a solidified layer, and consequently stacking the solidified layers to thereby form a member having a predetermined shape, and has a concept including powder building-up. The powder building-up method builds up, for example, a die for casting an aluminum alloy with a powder of the alloy composition according to the present embodiment, and can repair a damaged portion. This repaired portion constitutes the alloy ingot according to the present embodiment.

For the powder building-up, for example, plasma powder building-up wielding and laser powder building-up welding can be used.

The plasma powder building-up welding uses plasma as a heat source. In the plasma powder building-up welding, the welding is performed in an inert argon atmosphere, and accordingly, a built-up layer can be formed of which the surface is smooth, and in the inner part of which there are few voids.

The laser powder building-up welding uses a laser as a heat source. The laser powder building-up welding can narrow a heat input region, and accordingly has an advantage of being capable of building up a thin object. In addition, in the laser powder building-up welding, a region to be heated is small, and accordingly, the temperature gradient with respect to the substrate becomes large; and after the laser beam has passed through, the temperature is rapidly lowered and the substrate is rapidly cooled. Thus, the powder is melted and solidified, which is accordingly advantageous for refining of the dendritic structure.

For the laser powder building-up welding, laser metal deposition (LMD) can be used. The LMD forms a built-up layer on a surface of the substrate, by supplying a raw material powder while irradiating the substrate with a laser beam.

As the raw material powder for the powder building-up, an alloy powder can be used which has been produced by the above method or a method other than the above method.

In addition, if such a powder building-up welding machine is used as to be capable of supplying a plural types of powders, the welding machine can use an Mo powder, a Cr powder, a Ni powder and an Al powder as the raw material, and can use also an MoCr alloy powder and a NiAl alloy powder as the raw material. In this case, the raw material powder is alloyed by being melted and solidified, in the middle of the building-up. If according to this method, a gradient composition can be formed from the substrate to the surface. The gradient composition can be referred to as a composition in which the hardness and the composition ratio are different from the substrate toward the surface, by changing a ratio of MoCr to NiAl between the substrate component and the raw material powder. It leads to a reduction in cracking in between the additively manufacturing material and the substrate to eliminate a difference in hardness between the substrate and the additively manufacturing material (specifically, building-up alloy material). In addition, in the case where the erosion resistance and the galling resistance are respectively required in the adjacent regions of the surface in the surface portion, materials having different ratios of MoCr to NiAl can be added to the respective regions. In this way, a high-performance die excellent in wear resistance can be obtained by forming building-up alloys having different compositions, for a portion of the die, at which the erosion resistance is necessary, and a portion of the die, at which the galling resistance is necessary, respectively.

[Application]

As for the application of the composition of the present invention, the composition is suitably used as a repairing material for a die for casting of an aluminum alloy. For example, the composition is used for a die of a low pressure casting mold for molding an aluminum wheel, or a die of an aluminum cylinder head of an engine. In addition, the composition is also widely applied to other members which are required to withstand high temperatures. For example, the composition can be applied to a bearing or the like in which frictional heat can occur due to high-speed rotation.

In addition, the method for producing the alloy composition according to the present invention can also be applied to a method for repairing a built-up die.

Example 1

Next, one example of the present invention will be described on the basis of Examples.

The following four raw material powders were prepared, and were mixed so as to produce the following alloy composition.

Mo powder: particle size 3 to 8 μm
Cr powder: particle size 1 to 5 mm
Ni powder: particle size 8 to 15 mm
Al powder: particle size 40 μm or smaller
Alloy Composition:
Mo; 45 at. %, Cr; 15 at. %, Ni; 20 at. %, and Al; 20 at. %

The raw material powders in the above were melted in a high-frequency induction melting furnace, and an alloy ingot was obtained. The alloy ingot as melted and cast shall be represented as Sample No. 1. The liquidus-line temperature of Sample No. 1 was determined, and was consequently 1630° C. For information, the liquidus-line temperature is a value calculated by Thermo-calc (thermodynamic database: SSOL6).

Sample No. 1 was heat-treated at 1200° C. for 2 hours, and the resultant alloy ingot shall be represented as Sample No. 2.

In addition, the alloy ingot as melted and cast was partially remelted and solidified by irradiation with a laser beam. The remelting conditions are as follows. Note that an alloy ingot scanned at a lower speed shall be represented as Sample No. 3, and an alloy ingot scanned at a higher speed shall be represented as Sample No. 4.

The sizes of Sample Nos. 1 to 4 produced in Example 1 are all diameters 20 mm×lengths 50 mm.

Remelting Conditions
Device: YLR-2000-S 2 kW fiber laser manufactured by IPG Co., Ltd.
Output: 1200 W
Side gas: Ar
Incident angle of laser beam: 10°
Scanning width of laser beam: 13 mm
Scanning speed of laser beam: 100 mm/min (Sample No. 3)
500 mm/min (Sample No. 4)

Figure 4:
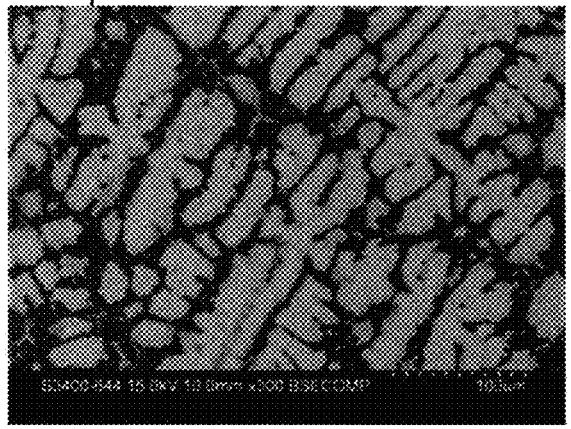
FIG. 4 shows photographs showing microstructures of samples of which the solidification rates of the alloy composition according to the present Example were changed.
Figure 4:
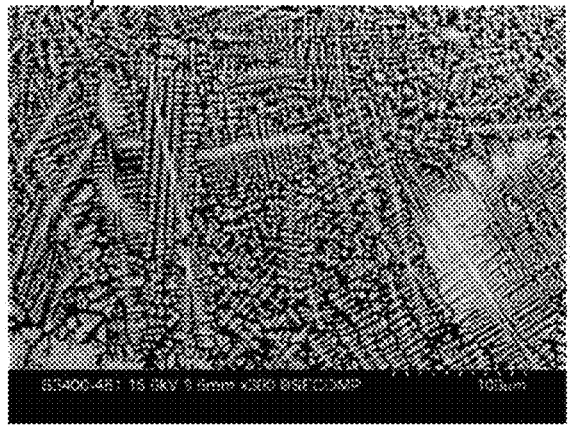
Figure 4:
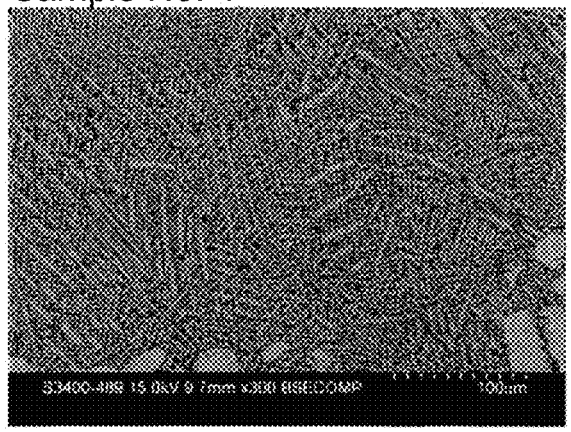

The microstructures of Sample Nos. 1, 3 and 4 were observed with a scanning electron microscope. The results are shown in FIG. 4. Note that as for Sample Nos. 3 and 4, the portions that were remelted and solidified were observed. The same applies also to the hardness.

Figure 5:
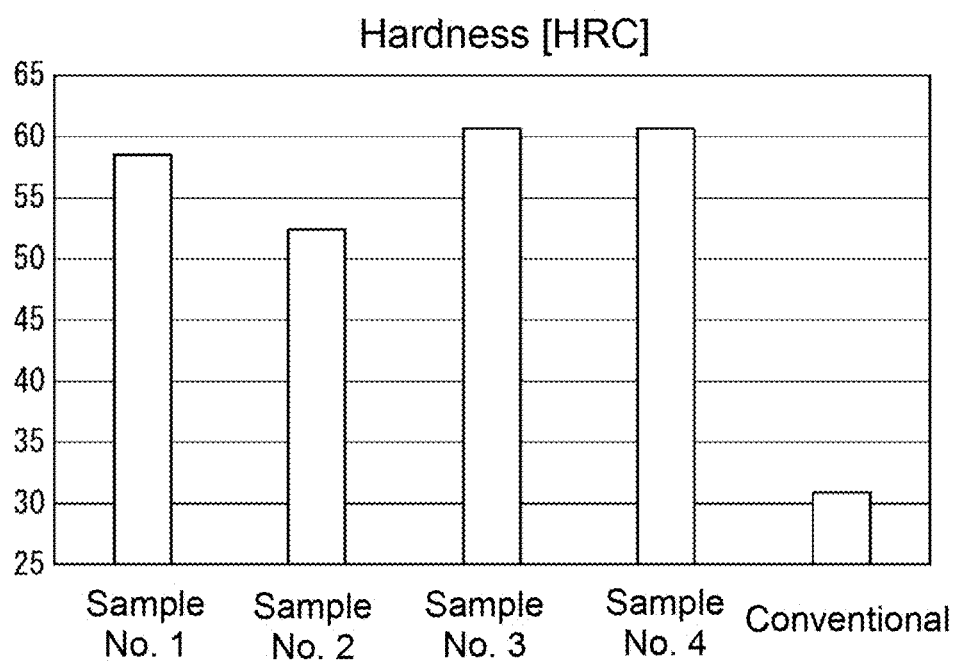
FIG. 5 is a graph which compares the hardness of the alloy composition according to the present Example with that of a conventional alloy.

In addition, on Sample Nos. 1 to 4 and a conventional alloy, Vickers hardness was measured with a Vickers hardness tester at room temperature under a load of 1000 gf for a holding time of 15 seconds. The measurement was performed 10 times, and an average value of 8 points except the maximum value and the minimum value was recorded. The measured Vickers hardness (HV) was converted into Rockwell hardness (HRC). For information, in the conversion, ASTM (American Society for Testing and Materials) E140 Table 2 was referred to. The results are shown in FIG. 5. The conventional alloy is DENSIMET 185 produced by Plansee SE, in Austria. For information, DENSIMET is a registered trademark of Plansee SE.

The structure observation position and the arm width measurement position are on a cross section through which the sample was cut, in other words, on a two-dimensional face. When the sample is an alloy ingot, the sample having a cross section for observation and measurement is cut out from the central portion of the ingot. In the case of remelted and solidified samples (Samples No. 3 and No. 4), a cross section parallel to the laser scanning direction was formed, and the cross section was polished and then was observed. Note that a reflected electron image was captured, and the arm widths W1 and W2 of the primary dendrite and the secondary dendrite were determined from the dendritic structure and the interdendritic structure. As for the arm width of the primary dendrite, the maximum width in a growth direction of the dendritic structure was measured. As for the arm width of the secondary dendrite, the widths were measured at arbitrary 10 places, and the average value was adopted. Note that as is shown in FIG. 4, it is understood that all of Sample Nos. 1, 3 and 4 have a composite structure of the dendritic structure and the interdendritic structure. This structure is observed on the basis of a difference in contrast due to a difference in composition. Here, the reflected electron image was converted into two gradations, and an area ratio of each color was derived by image analysis software. Firstly, as a result of the structure observation, the structure becomes finer in the order of Sample Nos. 1, 3 and 4. This is influenced by a cooling rate at the time of solidification. In other words, Sample No. 1 obtained by casting after melting in a high-frequency induction melting furnace is solidified at a slow cooling rate, as compared with that obtained by local remelting and solidification by irradiation with a laser beam. In addition, as for Sample No. 3 and Sample No. 4, Sample No. 4 has a finer structure as compared with Sample No. 3, because as the scanning speed of the laser beam is faster, a cooling rate at the time of solidification becomes faster. The measurement results of the arm widths W1 and W2 of Sample Nos. 1, 3 and 4 were as follows.

Sample No. 1: W1=20 μm, W2=30 μm, and area ratio of dendritic structure=68%
Sample No. 3: W1=6 μm, W2=10 μm, and area ratio of dendritic structure=62%
Sample No. 4: W1=6 μm, W2=4 μm, and area ratio of dendritic structure=70%

Next, as is shown in FIG. 5, all of Sample Nos. 1 to 4 according to the present Example have a hardness of HRC 50 or higher, and have a hardness of HRC 55 or higher except for Sample No. 2. Accordingly, when Sample Nos. 1 to 4 according to the present Example are used as a repairing material for a die for casting of an aluminum alloy, the Samples show high resistance to the galling. This is because the area ratio of the dendritic structure is less than 85%, and the Ni—Al-based interdendritic structure of a hard layer finely exists. In particular, the Sample Nos. 3 and 4 of which the structures are refined by remelting and solidification have a hardness of HRC 60 or higher, and show excellent resistance to the galling.

In addition, Sample No. 1 and Sample No. 2 indicate that the hardness of the alloy composition of the present embodiment can be adjusted by high-temperature heat treatment.

Compositions of the dendritic structure and the interdendritic structure in Sample No. 1 were analyzed with energy dispersive X-ray spectroscopy (EDX). The results are as follows.
Dendritic Structure:
Mo; 72.2 at. %, Cr; 24.6 at. %,
Ni; 1.8 at. %, Al; 1.4 at. %
Interdendritic Structure
Ni; 49.9 at. %, Al; 45.2 at. %
Mo; 0.8 at. %, Cr; 4.1 at. %

From the results of the above composition analysis, it is recognized that the interdendritic structure includes mainly a NiAl intermetallic compound which has a composition ratio of Ni and Al of 1:1.

Example 2

An alloy ingot was obtained in the same procedure as in Sample No. 1 except that the raw material powders prepared in Example 1 were used and mixed so as to produce the following three alloy compositions. The alloy ingots as melted and cast shall be represented as Sample Nos. 5, 6 and 7. The sizes of Sample Nos. 5 to 7 produced in Example 2 are all diameters 20 mm×lengths 50 mm.

Alloy Composition of Sample No. 5:
Mo; 15 at. %, Cr; 35 at. %, Ni; 25 at. %, and Al; 25 at. %

Alloy Composition of Sample No. 6:
Mo; 10 at. %, Cr; 50 at. %, Ni; 20 at. %, and Al; 20 at. %

Alloy Composition of Sample No. 7:
Mo; 19 at. %, Cr; 19 at. %, Ni; 28 at. %, and Al; 34 at. %

Comparative Example

As Comparative Example, the raw material powders prepared in Example 1 were used, and were mixed so as to produce the following alloy composition. It was tried to obtain an alloy ingot with the use of the mixed powder, in the same procedure as in Sample No. 1, but the mixed powder could not be melted in a high-frequency induction melting furnace, and an alloy ingot could not be obtained.
Mo; 65 at. %, Cr; 25 at. %, Ni; 5 at. %, and Al; 5 at. %

Discussion on Sample Nos. 1 and 5 to 7 and Comparative Example

The liquidus-line temperatures of Sample No. 5, 6, 7 and Comparative Example 1 were determined by Thermo-calc (thermodynamic database: SSOL6). In addition, Rockwell hardnesses (HRC) of Sample Nos. 5 to 7 were measured in the same manner as in the above description. The results are collectively shown in Table 1.

Accordingly, it is effective to increase the amount of Cr than that of Mo, and control the amount of Ni+Al to 50 at. % and the amount of Mo+Cr to 50 at. %, in order to achieve both of the desired hardness and the lowering of the melting point of the alloy composition.

Next, when Sample No. 1 and Sample No. 6 are compared, in both Samples, the amount of Ni+Al is 40 at. % and the amount of Mo+Cr is 60 at. %, but a liquidus-line temperature of Sample No. 6 (Mo: 10 at. % and Cr: 50 at. %) is lower than that of Sample No. 1 (Mo: 45 at. % and Cr: 15 at. %). Therefore, when the improvement of the oxidation resistance by containing Cr and the lowering of the melting point of the alloy composition are regarded as important, the Cr content may be set to be larger than the Mo content. According to Sample No. 6, it is possible to obtain a hardness of 50 HRC or higher, while keeping the liquidus-line temperature at 1550° C. or lower.

When Sample No. 5 (Ni+Al=50 at. %) and Sample No. 7 (Ni+Al=62 at. %) are compared, Sample No. 5 has a lower liquidus-line temperature and a higher hardness than Sample No. 7. Therefore, it has been found that the upper limit of the total amount of Ni and Al is 70 at. %, is further 60 at. %, and is more preferably 50 at. %.

Comparative Example 1 in which the total amount of Mo and Cr was 90 at. % and the total amount of Ni and Al was 10 at. % had such a high liquidus-line temperature as 2130° C., and could not be melted in a high-frequency induction melting furnace; and an alloy ingot could not be obtained. From this result, the upper limit of the total amount of Mo and Cr should be set at 85 at. %, and the lower limit of the total amount of Ni and Al should be set at 15 at. %. The

TABLE 1

| | | | Chemical composition of alloy composition (at. %) | | | | Mo + Cr | Ni + Al | Hardness | Liquidus-line temperature | |
|---|---|---|---|---|---|---|---|---|---|---|---|
| | | | Mo | Cr | Ni | Al | (at. %) | (at. %) | [HRC] | [° C.] | Remarks |
| Example 1 | Sample No. 1 | Ingot (alloy ingot) | 45 | 15 | 20 | 20 | 60 | 40 | 58.3 | 1630 | Within range of chemical composition I and II |
| Example 2 | Sample No. 5 | Ingot (alloy ingot) | 15 | 35 | 25 | 25 | 50 | 50 | 55.6 | 1505 | Within range of chemical composition I and II |
| | Sample No. 6 | Ingot (alloy ingot) | 10 | 50 | 20 | 20 | 60 | 40 | 54.2 | 1544 | Within range of chemical composition I and II |
| | Sample No. 7 | Ingot (alloy ingot) | 19 | 19 | 28 | 34 | 38 | 62 | 53.4 | 1540 | Within range of chemical composition II |
| Comparative Example | | Ingot (alloy ingot) being unproducible | 65 | 25 | 5 | 5 | 90 | 10 | — | 2130 | Outside of range of chemical composition I and II |

As is shown in Table 1, the liquidus-line temperatures of Sample Nos. 5 to 7 are lower than that of Sample No. 1, and the melting points of the alloy compositions are lowered.

In particular, Sample No. 5 (liquidus-line temperature: 1505° C.) shows a lower liquidus-line temperature than Sample No. 1 (liquidus-line temperature: 1630° C.) even by 125° C., while obtaining a hardness of 55 HRC or higher.

upper limit of the total amount of Mo and Cr is preferably 80 at. %, is more preferably 70 at. %, and is still more preferably 60 at. %. The lower limit of the total amount of Ni and Al is preferably 20 at. %, is more preferably 30 at. %, and is still more preferably 40 at. %.

The arm widths W1 and W2, and an area ratio of the dendritic structure of each of Sample No. 5, 6 and 7 were measured in the same procedure as in Example 1. The measurement results were as follows.

Sample No. 5: W1=11 μm, W2=9 μm, and area ratio of dendritic structure=58%

Sample No. 6: W1=17 μm, W2=11 μm, and area ratio of dendritic structure=66%

Sample No. 7: W1=8 μm, W2=7 μm, and area ratio of dendritic structure=57%

The measurement results for Sample No. 1 and the measurement results of Sample No. 5, 6 and 7 are collectively shown in Table 2.

TABLE 2

|  |  |  | Maximum arm width W1 [μm] | Maximum arm width W2 [μm] | Area ratio of dendritic structure [%] | Chemical composition of alloy composition (at. %) | | | |
|---|---|---|---|---|---|---|---|---|---|
|  |  |  |  |  |  | Mo | Cr | Ni | Al |
| Example 1 | Sample No. 1 | Ingot (alloy ingot) | 20 | 30 | 68 | 45 | 15 | 20 | 20 |
| Example 2 | Sample No. 5 | Ingot (alloy ingot) | 11 | 9 | 58 | 15 | 35 | 25 | 25 |
|  | Sample No. 6 | Ingot (alloy ingot) | 17 | 11 | 66 | 10 | 50 | 20 | 20 |
|  | Sample No. 7 | Ingot (alloy ingot) | 8 | 7 | 57 | 19 | 19 | 28 | 34 |

Figure 6:
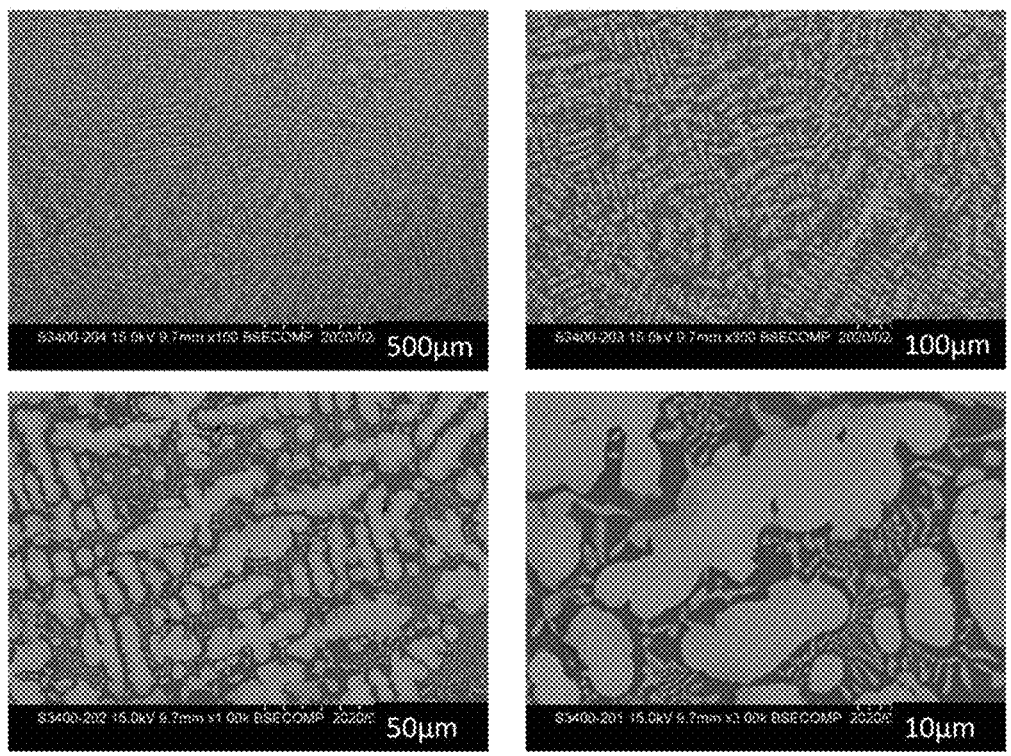
FIG. 6 shows photographs (SEM observation images) showing microstructures of an alloy composition (Sample No. 5: ingot) according to the present Example.
Figure 7:
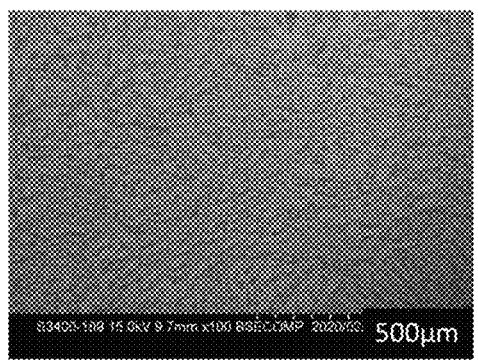
FIG. 7 shows photographs (SEM observation images) showing microstructures of an alloy composition (Sample No. 6: ingot) according to the present Example.
Figure 7:
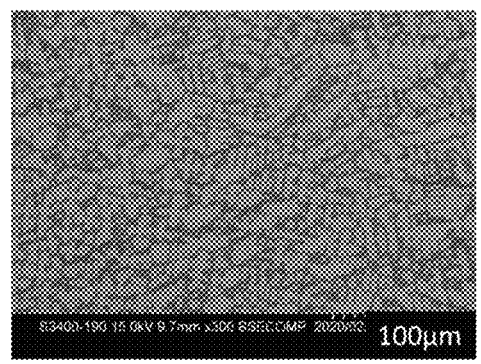
Figure 7:
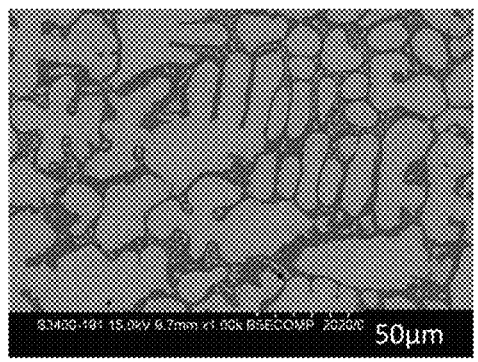
Figure 7:
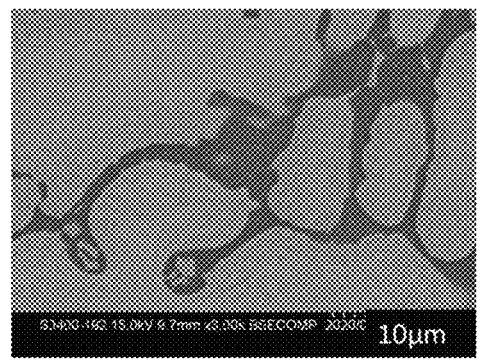

FIG. 6 shows a SEM observation image of Sample No. 5, and FIG. 7 shows a SEM observation image of Sample No. 6.

As shown in FIG. 6 and FIG. 7, it can be understood that Sample Nos. 5 and 6 also have a composite structure of a dendritic structure and an interdendritic structure.

In addition, from comparison between FIG. 6 and FIG. 7, it is understood that the structure of Sample No. 5 (FIG. 6) is finer than that of Sample No. 6 (FIG. 7). This result corresponds to a result that the arm widths W1 and W2 shown in Table 2 are both smaller in Sample No. 5. In addition, as shown in Table 1, the amount of Ni+Al is larger and the hardness is higher in Sample No. 5 than in Sample No. 6. This is because a percentage which the Ni—Al-based interdendritic structure occupies in the alloy composition is higher, and the Ni—Al-based interdendritic structure which contributes to improvement in hardness is more appropriately dispersed in the fine structure, in Sample No. 5 than in Sample No. 6.

The crystal structures of Sample Nos. 5 to 7 were analyzed by X-ray diffraction (XRD). The results are shown in FIG. 8.

Figure 8:
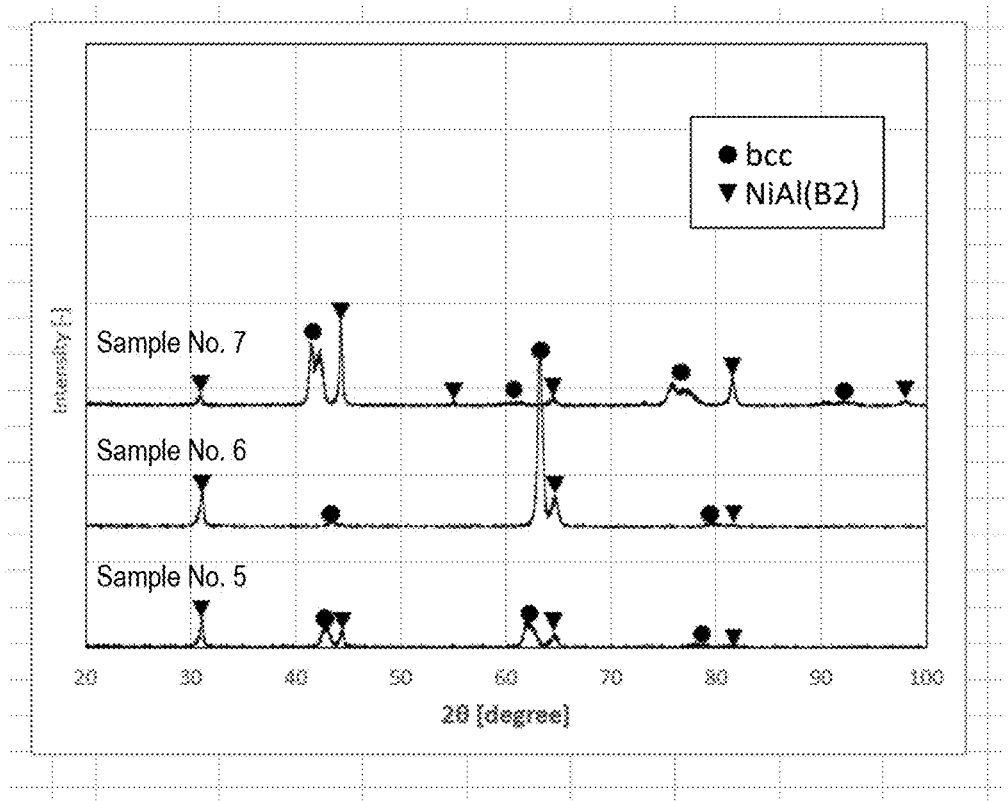
FIG. 8 is a figure showing analysis results of crystal structures of alloy compositions (samples No. 5 to 7: ingots) according to the present Example, by X-ray diffraction (XRD).

As is shown in FIG. 8, it has been confirmed in Sample Nos. 5 to 7 that a bcc phase and a NiAl (B2) phase were mixed.

Among Sample Nos. 5 to 7, in Sample No. 7 of which the total amount of Ni and Al is largest as 62 at. %, the peak intensity of the NiAl (B2) phase is highest. However, as shown in Table 1, the hardness of Sample No. 5 (Ni+Al=50 at. %) is higher than that of Sample No. 7. From this result, it has been found that the hardness correlates not only with a percentage which the Ni—Al-based interdendritic structure occupies in the alloy composition, but also with the refinement of the structure. It is assumed that as the structure of the alloy composition is finer and the Ni—Al-based interdendritic structure is more appropriately dispersed, the alloy composition is more advantageous in obtaining high hardness.

Example 3

In Example 3, two additively manufactured bodies were produced by the additive manufacturing by laser metal deposition (LMD) (Sample Nos. 8 and 9).

The size of the Sample Nos. 8 and 9 is 4 mm×20 mm×40 mm. Note that the additively manufactured body is hereinafter simply referred to as a manufactured body in some cases.

The following four raw material alloy powders for the additive manufacturing were prepared. A melted raw material of the raw material powder was prepared, and was melted by use of an ordinary high-frequency vacuum melting furnace, and thereby a mother alloy was produced: and an atomized powder was produced by a gas atomization method in an argon atmosphere. Note that powders having particle sizes of 53 of 150 μm were classified from the atomized powder and were subjected to the additive manufacturing. Sizes d10, d50 and d90 of the classified powders are d10: 58 μm, d50: 92 μm and d90: 148 μm, respectively.

Alloy compositions of Sample Nos. 8 and 9:

Mo; 19 at. %, Cr; 19 at. %, Ni; 28 at. %, and Al; 34 at. %

Additive Manufacturing Conditions:

Apparatus: Lasertec 65 manufactured by DMG Mori Co., Ltd. Building-up welding by laser metal deposition (LMD)

Substrate: Alloy 718

Scanning speed of laser beam: 1000 mm/min

Amount of raw material powder to be supplied: 14 g/min

Laser beam output: 1.6 kW (Sample No. 8)

2.0 kW (Sample No. 9)

[Discussion on Sample Nos. 8 and 9 (Manufactured Body) and Sample No. 7 (Ingot)]

The liquidus-line temperature and Rockwell hardness (HRC) of Sample Nos. 8 and 9 were determined in the same manner as in Examples 1 and 2. The results are collectively shown in Table 3 together with the results of Sample No. 7 (ingot) produced in Example 2.

TABLE 3

| | | | Chemical composition of alloy composition (at. %) | | | | Mo + Cr | Ni + Al | Hardness | Hardness after heat treatment | Liquidus-line temperature | |
|---|---|---|---|---|---|---|---|---|---|---|---|---|
| | | | Mo | Cr | Ni | Al | (at. %) | (at. %) | [HRC] | [HRC] | [° C.] | Remarks |
| Example 2 | Sample No. 7 | Ingot (alloy ingot) | 19 | 19 | 28 | 34 | 38 | 62 | 53.4 | 53.5 | 1540 | Within range of chemical composition II |
| Example 3 | Sample No. 8 | Manufactured body (laser beam output: 1.6 kW) | | | | | | | 50.4 | 50.8 | | |
| | Sample No. 9 | Manufactured body (laser beam output: 2.0 kW) | | | | | | | 49.4 | — | | |

As is shown in Table 3, the alloy compositions of Sample Nos. 7 to 9 are the same, and accordingly the liquidus-line temperatures are all 1540° C. The alloy compositions of Sample Nos. 7 to 9 fall within the range of the chemical composition II, and according to the chemical composition II, it was possible to achieve a liquidus-line temperature of 1600° C. or lower, and further 1550° C. or lower, while obtaining a hardness of 45 HRC or higher, and further near 50 HRC or 50 HRC or higher. In other words, it has been confirmed that the chemical composition II is an effective composition also in the case of production of an alloy composition by the additive manufacturing method.

In addition, the ingot (Sample No. 7) and the manufactured body (Sample No. 8) were subjected to heat treatment (heat treatment conditions: being held in vacuum at 700° C. for 10 hours), and the hardnesses after the heat treatment were determined. The results are shown in Table 3. Note that "hardness after heat treatment" was determined by converting Vickers hardness (HV) which was measured by the same method as described above, into Rockwell hardness (HRC). As a result of comparison between "hardness" and "hardness after heat treatment" in Table 3, it has been confirmed that there is almost no change in hardness before and after the heat treatment, and the sample before the heat treatment and the sample after the heat treatment have the same hardness. Specifically, it is considered that in the case of this alloy composition, the structure formed in the solidification process is stable at high temperature, and accordingly, the softening resistance has been high. In other words, it is considered that the alloy composition within the range of the chemical composition II is also suitable for a member which requires neat resistance, for example, a member such as a die-casting die in which Al erosion tends to easily occur.

Figure 9:
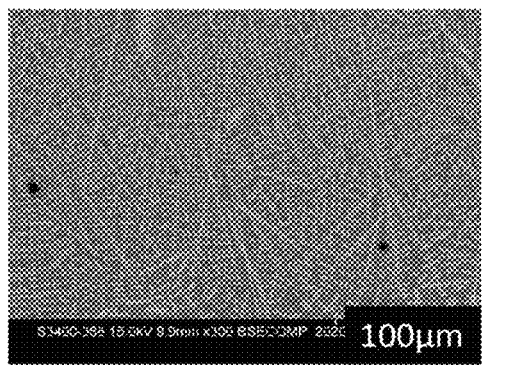
FIG. 9 shows photographs (SEM observation images) showing a microstructure of an alloy composition (Sample No. 8: additively manufactured body) according to the present Example.
Figure 9:
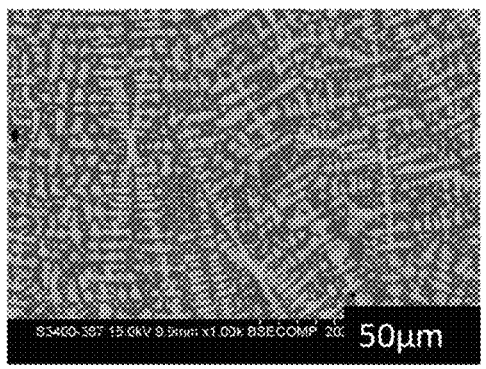
Figure 9:
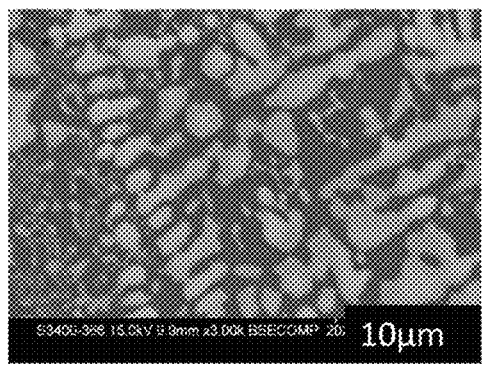
Figure 10:
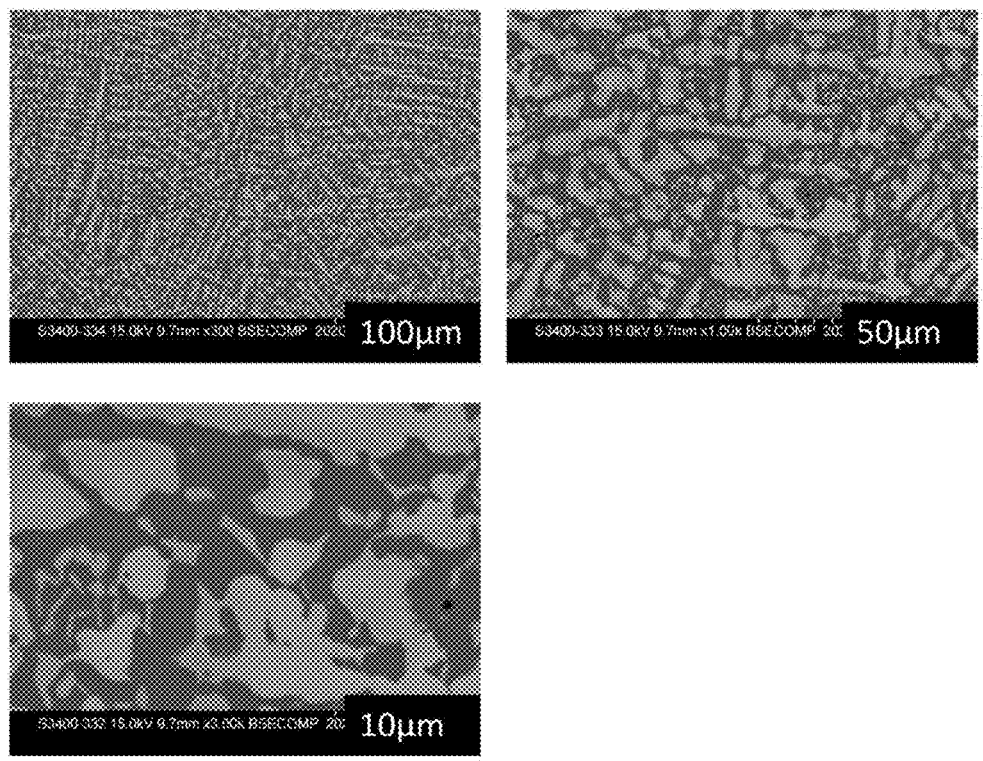
FIG. 10 shows photographs (SEM observation images) showing microstructures of an alloy composition (Sample No. 9: additively manufactured body) according to the present Example.

FIG. 9 shows a SEM observation image of Sample No. 8 (laser beam output: 1.6 kW), and FIG. 10 shows a SEM observation image of Sample No. S (laser beam output: 2.0 kW).

In addition, Table 4 snows the arm widths W1 and W2, and the area ratio of the dendritic structure, which were measured on Sample No. 8 and Sample No. 9, together with the results of Sample No. 5 to 7. The method for measuring the arm widths W1 and W2 is as described in the section of Example 1. Area ratios of the dendritic structures in Sample Nos. 8 and 9 were observed after cross sections parallel to the additive manufacturing direction (side surfaces of additively manufactured body) were polished.

As is shown in FIG. 9 and FIG. 10, it is understood that Sample Nos. 8 and 9 produced by the additive manufacturing method also have a composite structure of the dendritic structure and the interdendritic structure.

From comparison between FIG. 9 and FIG. 10, it is understood that the structure of Sample No. 8 (FIG. 9) is finer than that of Sample No. 9 (FIG. 10). This is because the cooling rate becomes higher in Sample No. 8 of which the laser beam output is smaller (laser beam output: 1.6 kW) than in Sample No. 9 (laser beam output: 2.0 W), and accordingly a finer dendritic structure (dendrite) is formed.

Furthermore, from comparisons between FIG. 6 (Sample No. 5, ingot) and FIG. 7 (Sample No. 6, ingot) shown in the section of Example 2, and FIG. 9 (Sample No. 8, additively manufactured body) and FIG. 10 (Sample No. 8, additively manufactured body) of the present Example, it has been confirmed that the structure of the additively manufactured body is more drastically refined than the structure of the ingot. This is supported also by the comparison between the arm widths W1 and W2 of Sample Nos. 8 and 9 (manufactured bodies) and the arm widths W1 and W2 of Sample Nos. 1 and 5 to 7 (ingots), which are all shown in Table 4. In Sample Nos. 1 and 5 to 7 (ingots) which were obtained by casting and solidification, the range of the arm width W1 is 8 to 20 μm and the range of the arm width W2 is 7 to 30 μm; and the dendritic structure becomes thick. On the other hand, in the Sample Nos. 8 and 9 which were obtained by the additive manufacturing, both of the arm widths W1 and W2 can be suppressed to 10 μm or smaller, and further 6 μm or smaller. As for Sample No. 8, both of the arm widths W1 and W2 can be suppressed to 3 μm or smaller. It is considered that the mean free path of the Ni—Al-based interdendritic structure thereby becomes small, accordingly regions in which the erosion resistance is low result in existing in a state of being finely dispersed, local erosion does not occur, and accordingly the erosion resistance of the entire alloy composition is enhanced. In other words, it is assumed that because the Mo—Cr-based dendritic structure of which the erosion resistance is high exists in a network shape, and the Ni—Al-based interdendritic structure of which the erosion resistance is lower than the Mo—Cr-based dendritic structure exists so as to fill the spaces among the Mo—Cr-based dendritic structures, Sample Nos. 8 and 9 which were obtained by the additive manufacturing improve the erosion resistance.

The area ratios of the dendritic structures of Sample Nos. 8 and 9 (Sample No. 8: 59%, and Sample No. 9: 56%) which are the manufactured bodies are lower than the area ratio (68%) of the dendritic structure of Sample No. 1 (ingot). However, the additively manufactured body has a very fine dendritic structure as described above, and accordingly, it is considered that Sample Nos. 8 and 9 (manufactured bodies) can obtain the erosion resistance equivalent to that of Sample No. 1 (ingot).

As described above, the liquidus-line temperature of Sample No. 1 (ingot) is 1630° C., and on the other hand, the liquidus-line temperatures of Sample Nos. 8 and 9 (manufactured bodies) are 1540° C. In other words, the liquidus-line temperatures of Sample Nos. 8 and 9 are lower than that of Sample No. 1 even by 90° C. Such lowering of the melting point of the alloy composition is advantageous when the alloy composition is applied to an additive manufacturing method such as a laser metal deposition (LMD). When a temperature of the alloy composition to be additively manufactured is high, a temperature of a molten pool during the additive manufacturing becomes high, in other words, a temperature difference from room temperature becomes large, and the amount of shrinkage occurring during cooling becomes large; and accordingly, cracks tend to easily occur in the manufactured body. The lowering of the melting point makes the temperature difference small, accordingly makes the manufactured body to resist being affected by thermal shrinkage occurring after the additive manufacturing, and enables stable additive manufacturing. This is because the formation of the beads which are welded to each other smoothly progresses.

In addition, when the melting point of the alloy composition is lowered, the raw material is melted by the output of a general laser beam without leaving an unmelted material, and defoaming and deposition proceed; and accordingly, a manufactured body free from defects tends to be easily formed.

Sample Nos. 8 and 9 were subjected to composition analysis of the dendritic structure and the interdendritic structure, by energy dispersive X-ray spectroscopy (EDX). The results are as follows.

From the EDX results, it has been found that the dendritic structure contains also Ni and Al. In addition, it has been confirmed that in the interdendritic structure, Mo does not almost exist, but a trace amount of Cr exists.

When the EDX result of Sample No. 1 (ingot) which was produced in Example 1 is compared with the EDX results of Sample Nos. 8 and 9 (manufactured bodies) which were produced in the present Example, the amounts of Al and Ni existing in the dendritic structure are larger in the manufactured bodies. Because of this, it is considered that a B2 ordered phase which mainly includes Ni and Al exists also in the dendritic structure in the manufactured body. In addition, the B2 ordered phase will be discussed later.

<Sample No. 8>
Dendritic Structure:
Mo; 46.7 at. %, Cr; 33.1 at. %,
Ni; 4.4 at. %, and Al; 15.8 at. %
Interdendritic Structure
Ni; 47.0 at. %, Al; 49.7 at. %,
Mo; 0.5 at. %, and Cr; 2.8 at. %
<Sample No. 9>
Dendritic Structure:
Mo; 53.4 at. %, Cr; 29.3 at. %,
Ni; 2.8 at. %, and Al; 14.5 at. %
Interdendritic Structure
Ni; 47.7 at. %, Al; 49.7 at. %
Mo; 0 at. %, and Cr; 2.6 at. %

Figure 11:
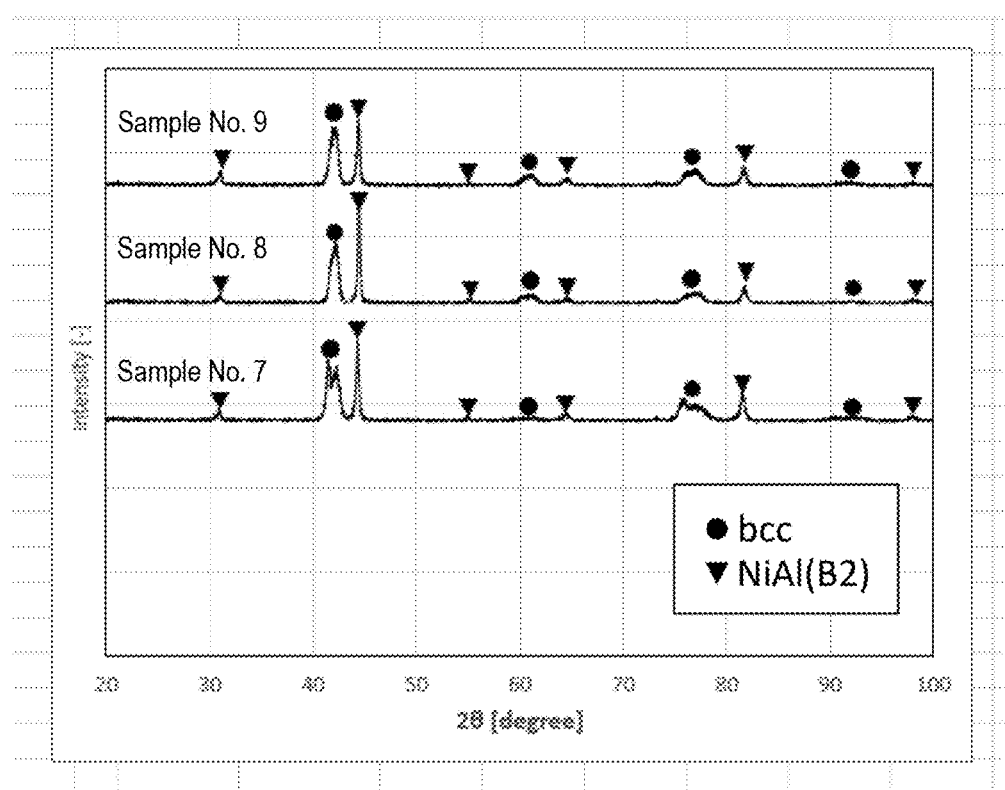
FIG. 11 is a figure showing analysis results of crystal structures of alloy compositions (Sample No. 7: ingot, and Sample Nos. 8 and 9: additively manufactured bodies) according to the present Example by X-ray diffraction (XRD).

FIG. 11 is a view showing results of analysis of crystal structures of Sample Nos. 8 and 9 which were produced in the present Example, by XRD. Note that FIG. 11 collectively shows also a result of XRD of Sample No. 7 having the same composition as Sample Nos. 8 and 9.

As is shown in FIG. 11, it has been confirmed that the bcc phase and the NiAl (B2) phase are mixed also in Sample Nos. 8 and 9 as in Sample No. 7.

Sample Nos. 7 to 9 had the same composition, and accordingly the peak positions of the bcc phase and the NiAl (B2) phase were not significantly different among the samples.

TABLE 4

|  |  |  | Maximum arm width W1 [μm] | Maximum arm width W2 [μm] | Area ratio of dendritic structure [%] | Remarks |
|---|---|---|---|---|---|---|
| Example 1 | Sample No. 1 | Ingot (alloy ingot) | 20 | 30 | 68 | Within range of chemical composition I and II |
| Example 2 | Sample No. 5 | Ingot (alloy ingot) | 11 | 9 | 58 | Within range of chemical composition I and II |
|  | Sample No. 6 | Ingot (alloy ingot) | 17 | 11 | 66 | Within range of chemical composition I and II |
|  | Sample No. 7 | Ingot (alloy ingot) | 8 | 7 | 57 | Within range of chemical composition II |
| Example 3 | Sample No. 8 | Manufactured body (laser beam output: 1.6 kW) | 2 | 3 | 59 |  |
|  | Sample No. 9 | Manufactured body (laser beam output: 2.0 kW) | 3 | 5 | 56 |  |

However, when Sample No. 8 and Sample No. 9 are compared, the maximum peak intensities of the bcc phase and the NiAl (B2) phase are larger in Sample No. 8 for which the laser beam output was smaller (laser beam output: 1.6 kW).

Figure 12:
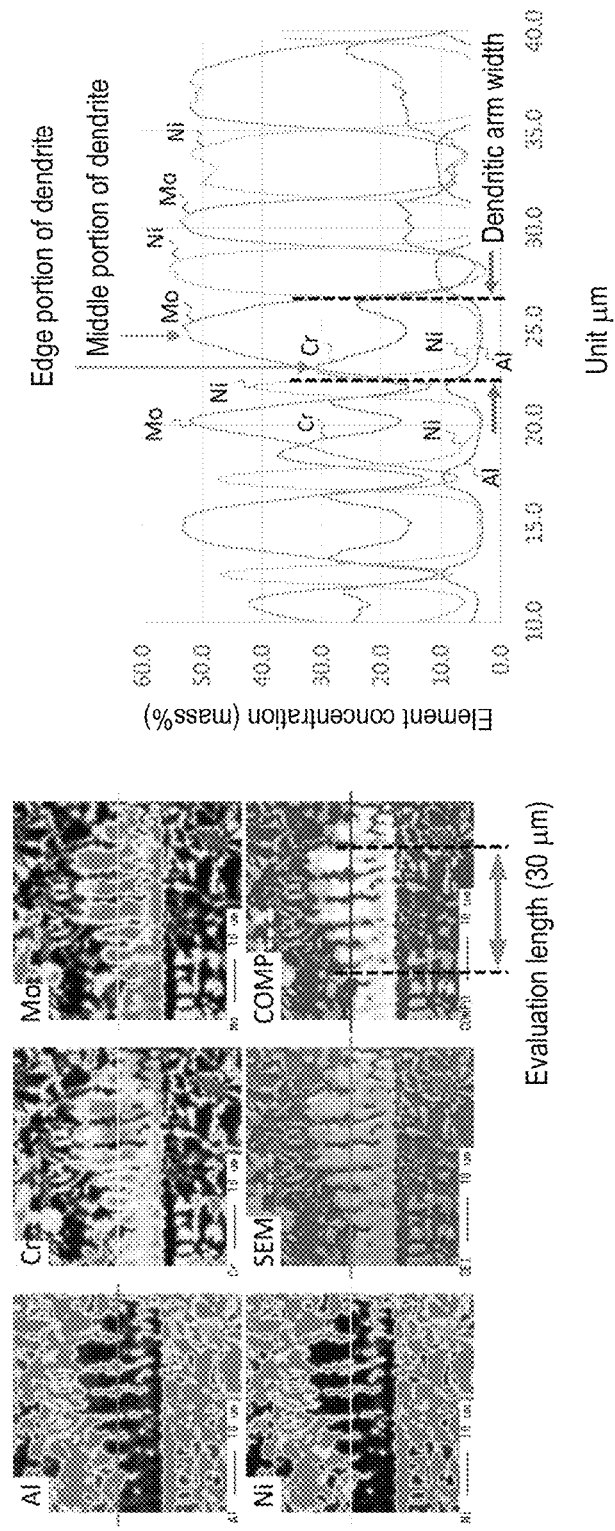
FIG. 12 shows views showing the results of evaluation of an element distribution in a dendritic structure of an alloy composition (Sample No. 7: ingot) according to the present Example.

Sample No. 7 (ingot) was subjected to an evaluation of an element distribution of the dendritic structure, and FIG. 12 shows the result.

The results of area analysis by EPMA are shown in the left view of FIG. 12. For the area analysis by EPMA, JXA 8500F was used which was manufactured by JEOL Ltd. The analysis conditions were set as follows: accelerating voltage: 15 kV, irradiation current: 0.02 A, beam diameter: φ0.1 μm, step size: 0.2 μm, irradiation time period: 30 msec, and spot number: 250×250 points. The area analysis was performed in an area of 50 μm×50 μm. The obtained analysis result was converted into a display by concentration, and line analysis evaluation was performed at an arbitrary position so as to cross the dendritic structure; and thereby the element distribution of the dendritic structure was evaluated.

As a result, as is shown in the right view of FIG. 12, it has been confirmed that in the dendritic structure of Sample No. 7, there is a region in which a Cr/Mo ratio is different between an edge portion of a dendrite and a middle portion of the dendrite. These portions in Sample No. 7 were analyzed and evaluated, and as a result, a region existed in which the Cr/Mo ratio in the middle portion was about 0.4, but on the other hand, the Cr/Mo ratio was 0.6 or larger in the edge portion.

The right view of FIG. 12 shows that Al and Ni are contained also in the Mo—Cr-based dendritic structure.

Sample No. 8 (manufactured body) which had the same chemical composition as Sample No. 7 (ingot) was also subjected to the evaluation of the element distribution in the dendritic structure, in the same manner as in Sample No. 7. As a result, it has been confirmed that also in the dendritic structure of Sample No. 8, there is a region in which the Cr/Mo ratio is different between the edge portion of the dendrite and the middle portion of the dendrite. Also in Sample No. 8, a region existed in which the Cr/Mo ratio in the middle portion was about 0.4, but on the other hand, the Cr/Mo ratio was 0.6 or larger in the edge portion.

Figure 13:
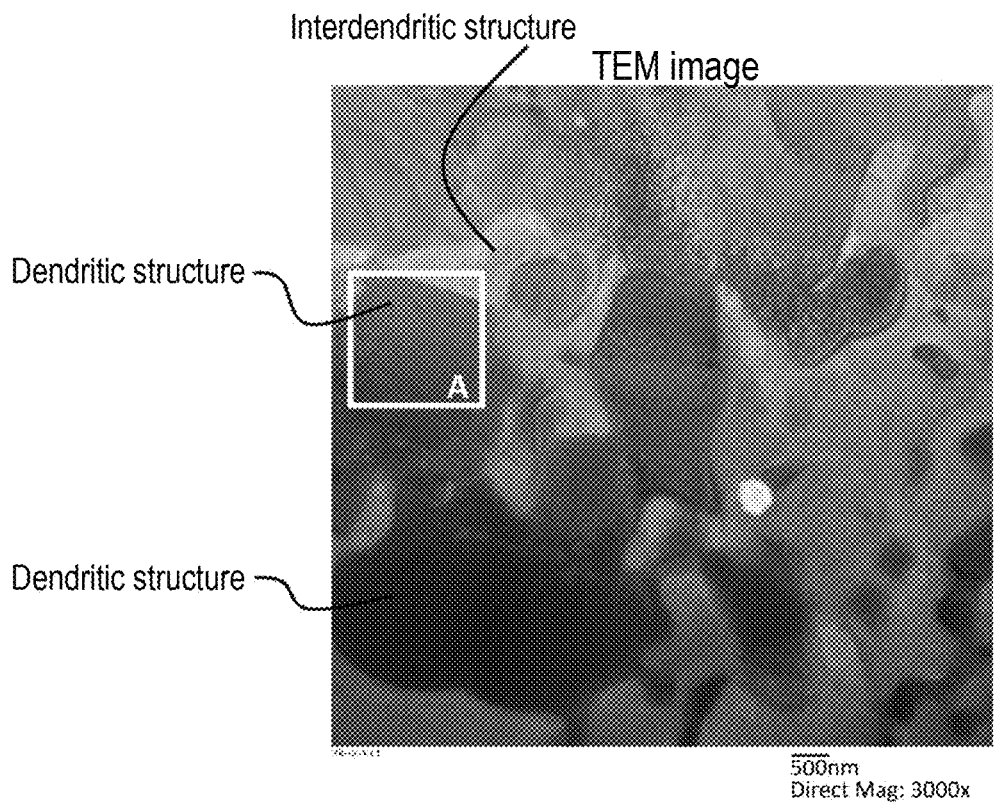
FIG. 13 is a TEM image of Sample No. 8 (additively manufactured body), which was observed with a TEM (Transmission Electron Microscope).

In order to evaluate the microstructure in the dendritic structure, high magnification observation was performed using a TEM (Transmission Electron Microscope) (magnification: 3000 times). FIG. 13 shows a TEM image of Sample No. 8 (additively manufactured body, before heat treatment). In FIG. 13, a dark gray region is the dendritic structure, and a light gray region is the interdendritic structure.

Figure 14:
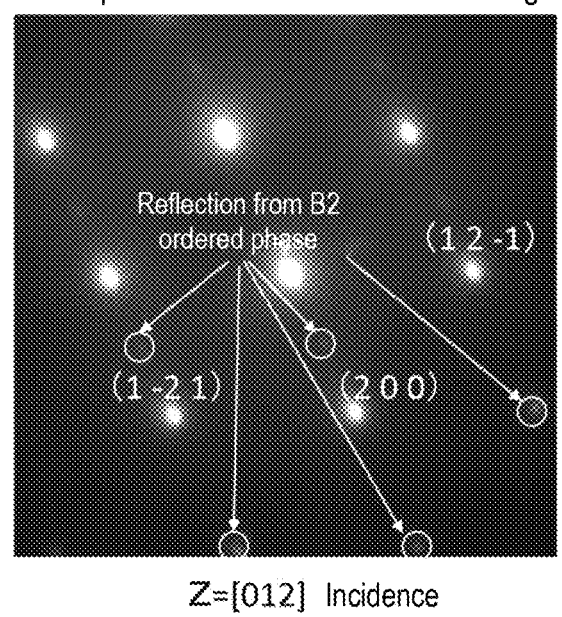
FIG. 14 shows the result of electron beam diffraction in a dendritic structure in the region A shown in FIG. 13.

FIG. 14 shows the results of electron beam diffraction in the dendritic structure in the region A of FIG. 13. From the analysis result of the electron beam diffraction image, it could be identified that the main phase of the dendritic structure was the bcc structure, but spots of the B2 ordered phase were slightly checked in the dendritic structure.

Figure 15:
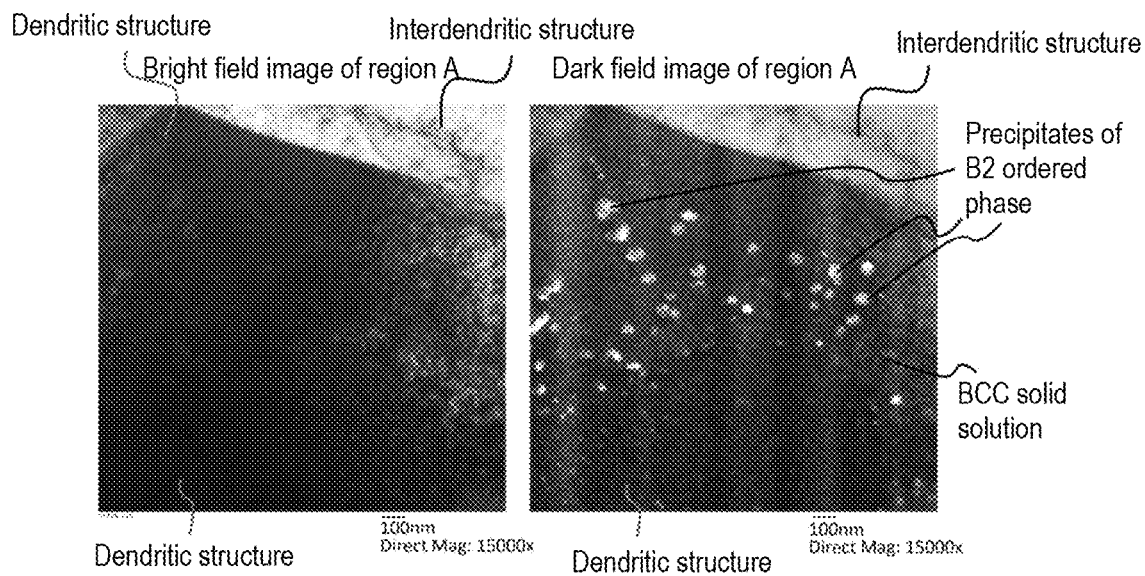
FIG. 15 is a STEM image obtained when the above region A of Sample No. 8 (additively manufactured body) was observed with a STEM (Scanning Transmission Electron Microscope).

For information, the conditions of the electron diffraction are as follows.
Model of apparatus: model HF-2100 manufactured by Hitachi High-Tech Corporation
Acceleration voltage: 200 kV
Selected area diffraction method: selected area: φ200 nm FIG. 15 is a STEM image obtained when the above region A of Sample No. 8 (additively manufactured body) has been observed with a STEM (Scanning Transmission Electron Microscope). The left side is a bright field image (BF-STEM image), and the right side is a dark field image (DF-STEM image). Note that the dark field image is captured after such adjustment as to cause the diffraction of the B2 ordered phase shown in FIG. 14.

From the dark field image of FIG. 15, it is understood that B2 ordered phases are distributed as a granular structure of about 100 nm. It is considered that because such fine precipitates exist, the hardness of the dendritic structure has been improved. It is considered that because this B2 ordered phase is stable even in a high temperature environment of about 700° C., which is used in a die for Al die-casting, Sample No. 8 (additively manufactured body) has caused little change in hardness before and after the heat treatment at 700° C. and has shown high softening resistance, as shown in Table 3.

For information, procedures of sample preparation for and observation conditions of TEM and STEM are as follows.
<Procedures of Sample Preparation for TEM and STEM>
One face of Sample No. 8 (additively manufactured body) was polished, and a test piece having a thickness of about 100 nm was prepared by a microsampling method using Focused Ion Beam (FIB). For information, for the microsampling, model FB-2100 manufactured by Hitachi High-Technologies Corporation was used.
<Observation Conditions of TEM and STEM>
Sample thicknesses: 100 nm
Model of apparatus: model HF-2100 manufactured by Hitachi High-Technologies Corporation
Acceleration voltage: 200 kV In the above, preferred embodiments and Examples of the present invention have been described, but in addition to the above description, the configurations described in the above embodiments can be selected, or appropriately changed to other configurations, without departing from the gist of the present invention.

REFERENCE SIGNS LIST

1 alloy composition
3 dendritic structure
5 interdendritic structure
W1 arm width of primary dendrite
W2 arm width of secondary dendrite

The invention claimed is:
1. An alloy composition comprising:
a Mo—Cr-based dendritic structure; and
a Ni—Al-based interdendritic structure that fills a periphery of the Mo—Cr-based dendritic structure, wherein
the alloy composition comprises: 20 to 35 at. % of Ni, 20 to 35 at. % of Al, 10 to 50 at. % of Cr, and balance of Mo and unavoidable impurities,
Ni+Al=40 to 50 at. %, and Mo+Cr=50 to 60 at. % hold, and
a percentage of an area of the Mo—Cr-based dendritic structure is 50 to 65% of a total area of the Mo—Cr-based dendritic structure and the Ni—Al-based interdendritic structure.
2. The alloy composition according to claim 1, wherein the maximum arm width of the Mo—Cr-based dendritic structure is 10 μm or smaller.
3. The alloy composition according to claim 1, wherein a region where a Cr/Mo ratio varies exists in the Mo—Cr-based dendritic structure.
4. The alloy composition according to claim 3, wherein the Cr/Mo ratio in the Mo—Cr-based dendritic structure is high in an edge portion of a dendrite as compared with that in a middle portion of a dendritic structure.

5. The alloy composition according to claim 1, wherein a maximum arm width of the Mo—Cr-based dendritic structure is 50 μm or smaller.

6. The alloy composition according to claim 1, wherein a Rockwell hardness is HRC 45 or higher.

7. A method for producing the alloy composition according to claim 1, comprising:
   melting a raw material powder that contains one or both of an elemental metal powder of Mo, Cr, Ni or Al, and an alloy powder including two or more metals selected from Mo, Cr, Ni and Al and solidifying the melt to produce the alloy composition.

8. A method for producing the alloy composition according to claim 1, comprising:
   additively manufacturing the alloy composition while melting a raw material powder that contains one or both of an elemental metal powder of Mo, Cr, Ni or Al, and an alloy powder including two or more metals selected from Mo, Cr, Ni and Al and solidifying the melt.

9. A die using the alloy composition according to claim 1 for a repairing material.

* * * * *

UNITED STATES PATENT AND TRADEMARK OFFICE
CERTIFICATE OF CORRECTION

PATENT NO. : 11,932,921 B2
APPLICATION NO. : 17/416920
DATED : March 19, 2024
INVENTOR(S) : Shuho Koseki et al.

It is certified that error appears in the above-identified patent and that said Letters Patent is hereby corrected as shown below:

In the Specification

Column 23, Line 56, "requires neat resistance" should read -- requires heat resistance --

Column 23, Line 60, "Sample No. S. (laser beam" should read -- Sample No. 9 (laser beam --

Column 23, Line 62, "Table 4 snows the arm" should read -- Table 4 shows the arm --

Signed and Sealed this
Fifth Day of November, 2024

Katherine Kelly Vidal
*Director of the United States Patent and Trademark Office*